United States Patent
Viger et al.

(10) Patent No.: US 11,812,467 B2
(45) Date of Patent: Nov. 7, 2023

(54) EMISSION OF A SIGNAL IN UNUSED RESOURCE UNITS TO INCREASE ENERGY DETECTION OF AN 802.11 CHANNEL

(71) Applicant: CANON KABUSHIKI KAISHA, Tokyo (JP)

(72) Inventors: Pascal Viger, Janze (FR); Patrice Nezou, Saint Sulpice la Foret (FR); Stéphane Baron, Le Rheu (FR); Romain Guignard, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 16/872,869

(22) Filed: May 12, 2020

(65) Prior Publication Data
US 2020/0275486 A1 Aug. 27, 2020

Related U.S. Application Data

(63) Continuation of application No. 15/738,504, filed as application No. PCT/EP2016/064005 on Jun. 17, 2016, now Pat. No. 10,681,731.

(30) Foreign Application Priority Data

Jun. 24, 2015 (GB) ..................................... 1511149

(51) Int. Cl.
*H04W 74/08* (2009.01)
*H04W 84/12* (2009.01)

(52) U.S. Cl.
CPC ........ *H04W 74/0808* (2013.01); *H04W 84/12* (2013.01)

(58) Field of Classification Search
CPC ............. H04W 74/0808; H04W 84/12; H04W 74/0816; H04W 74/0866
See application file for complete search history.

(56) References Cited

U.S. PATENT DOCUMENTS 7,327,710 B2 * 2/2008 Nishimura ............ H04L 1/0038
370/320
10,454,650 B2 * 10/2019 Kim .................... H04W 52/246
(Continued)

FOREIGN PATENT DOCUMENTS

| CN | 104039013 A | 9/2014 |
| CN | 104247488 A | 12/2014 |

(Continued)

OTHER PUBLICATIONS

Motorola Mobility; "Introduction of D2D (ProSe), Dual Connectivity, Small Cell Enhancements, and NAICS features"; R1-144520; 3GPP TSG-RAN WG1 Meeting #78bis; Ljubljana, Slovenia; Oct. 14, 2014; pp. 1-211.

*Primary Examiner* — Jay P Patel
(74) *Attorney, Agent, or Firm* — Canon U.S.A., Inc. IP Division

(57) ABSTRACT

In an 802.11ax network with an access point, a trigger frame offers scheduled and random resource units to nodes for data uplink communication to the access point. To avoid the overall energy level seen by legacy nodes for a communication channel to drop below a detection threshold, the invention provides two tools. First, the scheduled and random resource units may be interleaved over communication channels. Second, unused resource units may be detected, and a node or the access point may send a padding signal on them to increase the overall energy level. The latter may be evaluated during a monitoring period before deciding to emit the signal. As the overall energy level seen by legacy nodes is increased, the risk that such legacy nodes do not detect activity on a 20 MHz channel having only a subpart of its RUs used is reduced. And risks of collisions are consequently reduced.

15 Claims, 8 Drawing Sheets

(56) References Cited

U.S. PATENT DOCUMENTS

| | | | |
|---|---|---|---|
| 10,701,730 B2 * | 6/2020 | Kim | H04L 27/2602 |
| 11,064,488 B2 * | 7/2021 | Hedayat | H04W 72/0453 |
| 2014/0079016 A1 | 3/2014 | Dai et al. | |
| 2015/0078352 A1 | 3/2015 | Rong et al. | |
| 2016/0112984 A1 * | 4/2016 | Patil | H04W 52/0216 |
| | | | 455/458 |
| 2016/0112986 A1 * | 4/2016 | Patil | H04W 68/02 |
| | | | 455/515 |
| 2016/0112987 A1 * | 4/2016 | Patil | H04W 74/002 |
| | | | 455/515 |
| 2016/0119894 A1 * | 4/2016 | Patil | H04W 8/005 |
| | | | 455/515 |
| 2016/0119927 A1 * | 4/2016 | Hedayat | H04W 72/12 |
| | | | 370/329 |
| 2016/0165589 A1 * | 6/2016 | Chu | H04W 72/005 |
| | | | 370/329 |
| 2016/0301491 A1 * | 10/2016 | Porat | H04W 24/08 |
| 2016/0302185 A1 * | 10/2016 | Sun | H04W 8/24 |
| 2016/0316458 A1 * | 10/2016 | Kwon | H04W 72/02 |
| 2016/0330714 A1 * | 11/2016 | Hedayat | H04L 5/0023 |
| 2016/0330757 A1 * | 11/2016 | Cherian | H04W 72/1268 |
| 2016/0359653 A1 * | 12/2016 | Lee | H04L 27/0006 |
| 2017/0272138 A1 * | 9/2017 | Chun | H04W 74/006 |
| 2018/0070349 A1 * | 3/2018 | Huang | H04L 5/0053 |
| 2018/0139635 A1 * | 5/2018 | Oteri | H04W 84/12 |
| 2018/0227952 A1 * | 8/2018 | Kim | H04W 74/0816 |
| 2018/0343096 A1 * | 11/2018 | Kim | H04W 16/28 |
| 2019/0140728 A1 * | 5/2019 | Moon | H04B 7/0617 |
| 2019/0223220 A1 * | 7/2019 | Choi | H04W 74/0816 |
| 2019/0261418 A1 * | 8/2019 | Chu | H04W 74/004 |

FOREIGN PATENT DOCUMENTS

| | | | | |
|---|---|---|---|---|
| CN | 104303580 A | 1/2015 | | |
| CN | 104322110 A | 1/2015 | | |
| EP | 2620017 B1 | 7/2013 | | |
| GB | 2511866 A * | 9/2014 | | H04W 74/04 |
| WO | 2012061484 A2 | 5/2012 | | |

* cited by examiner

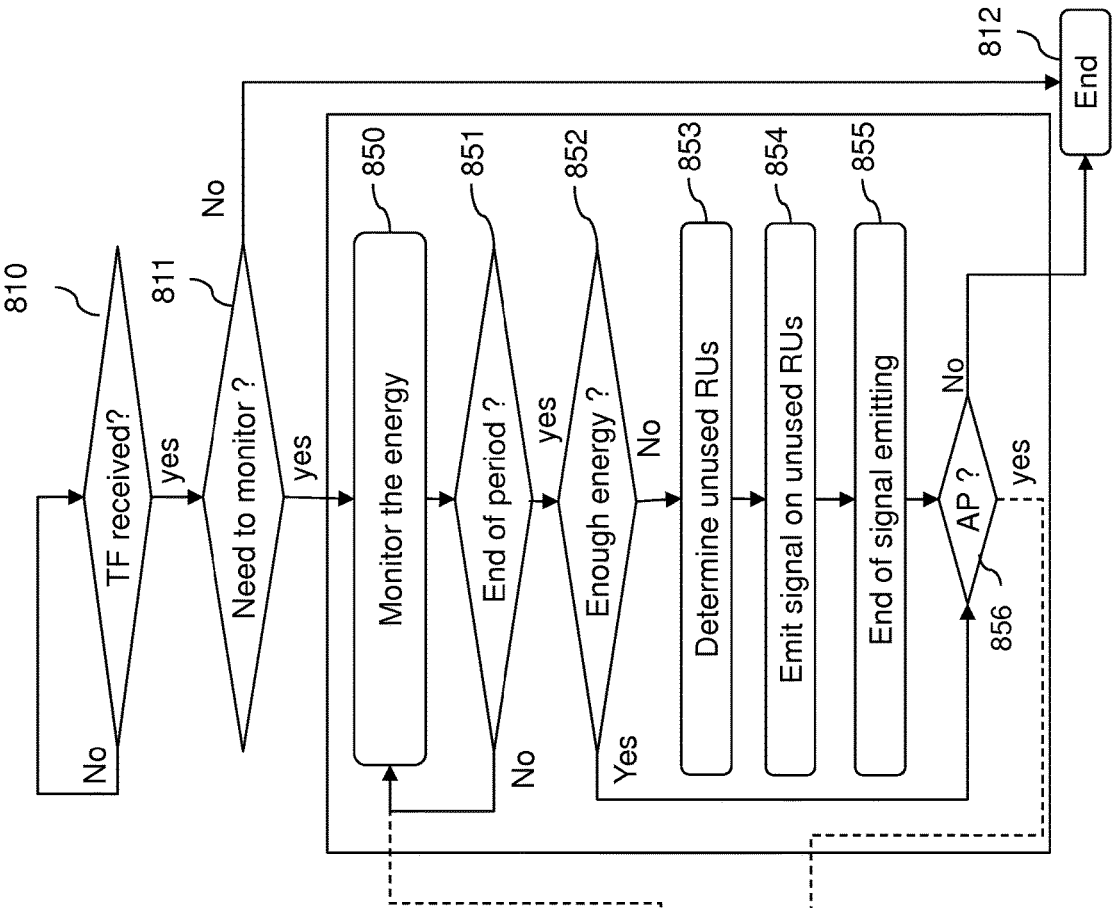
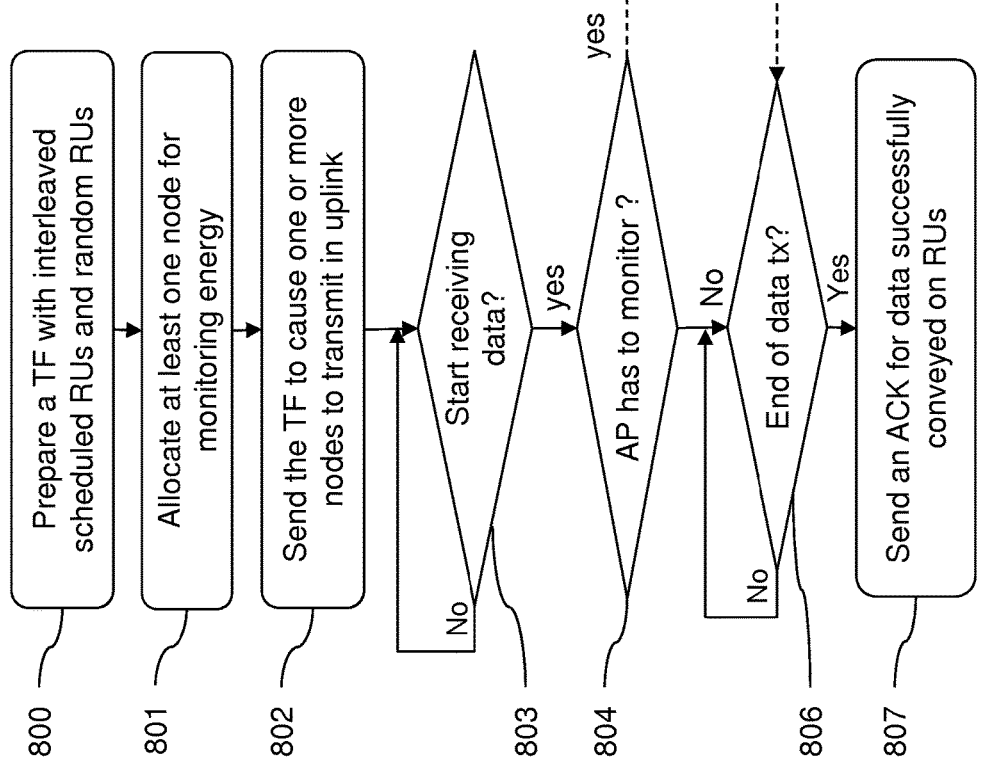

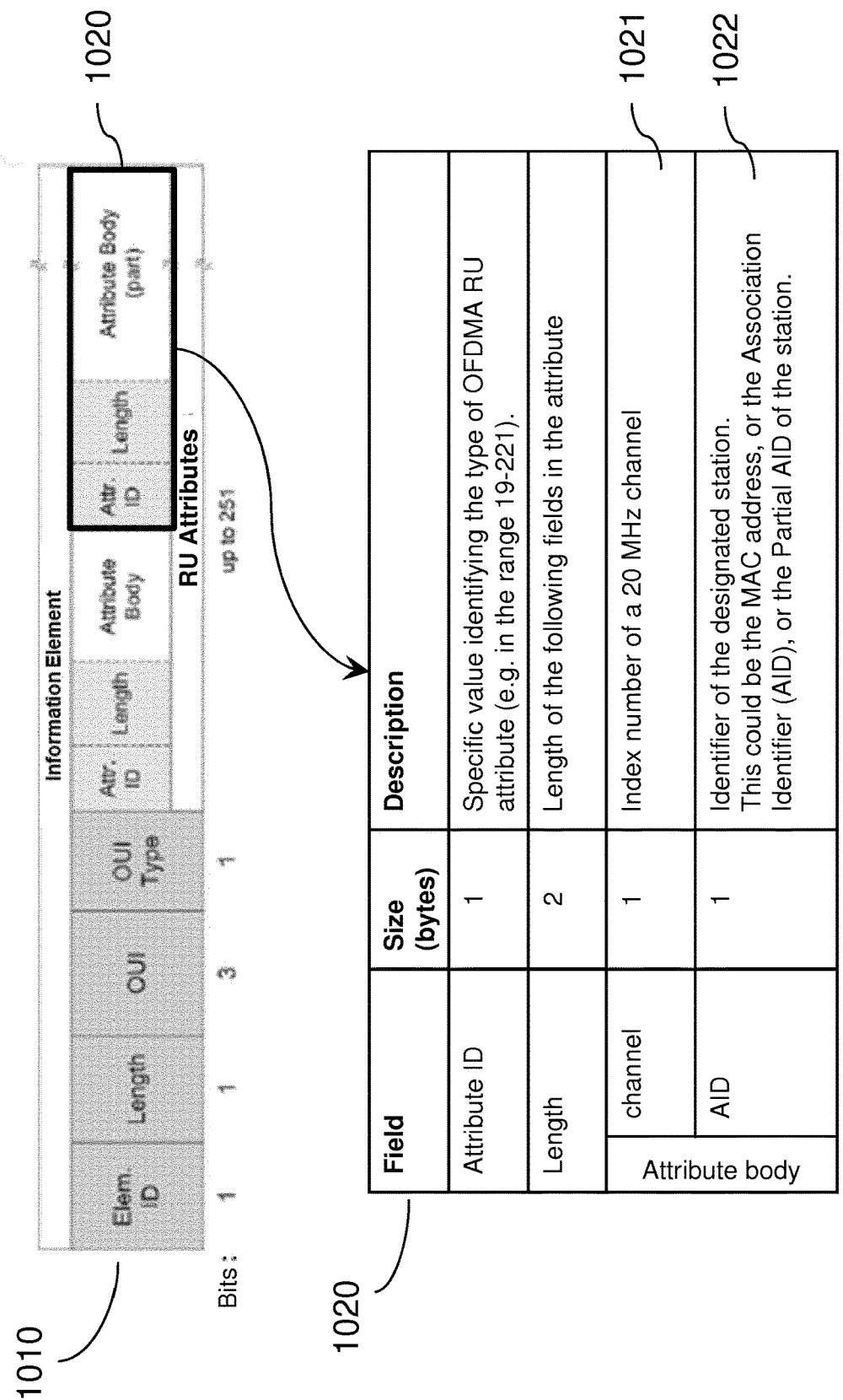

EMISSION OF A SIGNAL IN UNUSED RESOURCE UNITS TO INCREASE ENERGY DETECTION OF AN 802.11 CHANNEL

CROSS REFERENCE TO RELATED APPLICATIONS

The present application is a Continuation of U.S. patent application Ser. No. 15/738,504, filed on Dec. 20, 2017, which is a National Stage Entry of International Patent Application No. PCT/EP2016/064005, filed on Jun. 17, 2016, which claims priority to Patent Application No. GB1511149.5, filed in the United Kingdom on Jun. 24, 2015, all of which are hereby incorporated by reference herein in their entireties.

FIELD OF THE INVENTION

The present invention relates generally to wireless communication networks.

BACKGROUND OF THE INVENTION

The IEEE 802.11 MAC standard defines the way Wireless local area networks (WLANs) must work at the physical and medium access control (MAC) level. Typically, the 802.11 MAC (Medium Access Control) operating mode implements the well-known Distributed Coordination Function (DCF) which relies on a contention-based mechanism based on the so-called "Carrier Sense Multiple Access with Collision Avoidance" (CSMA/CA) technique.

The 802.11 medium access protocol standard or operating mode is mainly directed to the management of communication nodes waiting for the wireless medium to become idle so as to try to access to the wireless medium.

The network operating mode defined by the IEEE 802.11ac standard provides very high throughput (VHT) by, among other means, moving from the 2.4 GHz band which is deemed to be highly susceptible to interference to the 5 GHz band, thereby allowing for wider frequency contiguous channels of 80 MHz to be used, two of which may optionally be combined to get a 160 MHz channel as operating band of the wireless network.

The 802.11ac standard also tweaks control frames such as the Request-To-Send (RTS) and Clear-To-Send (CTS) frames to allow for composite channels of varying and predefined bandwidths of 20, 40 or 80 MHz, the composite channels being made of one or more channels that are contiguous within the operating band. The 160 MHz composite channel is possible by the combination of two 80 MHz composite channels within the 160 MHz operating band. The control frames specify the channel width (bandwidth) for the targeted composite channel.

A composite channel therefore consists of a primary channel on which a given node performs EDCA backoff procedure to access the medium, and of at least one secondary channel, of for example 20 MHz each. The primary channel is used by the communication nodes to sense whether or not the channel is idle, and the primary channel can be extended using the secondary channel or channels to form a composite channel.

Sensing of channel idleness is made using CCA (clear channel assessment), and more particularly CCA-ED, standing for CCA-Energy Detect. CCA-ED is the ability of any node to detect non-802.11 energy in a channel and back off data transmission. An ED threshold based in which the energy detected on the channel is compared is for instance defined to be 20 dB above the minimum sensitivity of the PHY layer of the node. If the in-band signal energy crosses this threshold, CCA is held busy until the medium energy becomes below the threshold anew.

Given a tree breakdown of the operating band into elementary 20 MHz channels, some secondary channels are named tertiary or quaternary channels.

In 802.11ac, all the transmissions, and thus the possible composite channels, include the primary channel. This is because the nodes perform full Carrier Sense Multiple Access/Collision Avoidance (CSMA/CA) and Network Allocation Vector (NAV) tracking on the primary channel only. The other channels are assigned as secondary channels, on which the nodes have only capability of CCA (clear channel assessment), i.e. detection of an idle or busy state/status of said secondary channel.

An issue with the use of composite channels as defined in the 802.11n or 802.11ac (or 802.11ax) is that the 802.11n and 802.11ac-compliant nodes (i.e. HT nodes standing for High Throughput nodes) and the other legacy nodes (i.e. non-HT nodes compliant only with for instance 802.11a/b/g) have to co-exist within the same wireless network and thus have to share the 20 MHz channels.

To cope with this issue, the 802.11n and 802.11ac standards provide the possibility to duplicate control frames (e.g. RTS/CTS or CTS-to-Self or ACK frames to acknowledge correct or erroneous reception of the sent data) in an 802.11a legacy format (called as "non-HT") to establish a protection of the requested TXOP over the whole composite channel.

This is for any legacy 802.11a node that uses any of the 20 MHz channel involved in the composite channel to be aware of on-going communications on the 20 MHz channel. As a result, the legacy node is prevented from initiating a new transmission until the end of the current composite channel TXOP granted to an 802.11n/ac node.

As originally proposed by 802.11n, a duplication of conventional 802.11a or "non-HT" transmission is provided to allow the two identical 20 MHz non-HT control frames to be sent simultaneously on both the primary and secondary channels forming the used composite channel.

This approach has been widened for 802.11ac to allow duplication over the channels forming an 80 MHz or 160 MHz composite channel. In the remainder of the present document, the "duplicated non-HT frame" or "duplicated non-HT control frame" or "duplicated control frame" means that the node device duplicates the conventional or "non-HT" transmission of a given control frame over secondary 20 MHz channel(s) of the (40 MHz 80 MHz or 160 MHz) operating band.

In practice, to request a composite channel (equal to or greater than 40 MHz) for a new TXOP, an 802.11n/ac node does an EDCA backoff procedure in the primary 20 MHz channel. In parallel, it performs a channel sensing mechanism, such as a Clear-Channel-Assessment (CCA) signal detection, on the secondary channels to detect the secondary channel or channels that are idle (channel state/status is "idle") during a PIFS interval before the start of the new TXOP (i.e. before the backoff counter expires). More recently, Institute of Electrical and Electronics Engineers (IEEE) officially approved the 802.11ax task group, as the successor of 802.11ac. The primary goal of the 802.11ax task group consists in seeking for an improvement in data speed to wireless communicating devices used in dense deployment scenarios.

Recent developments in the 802.11ax standard sought to optimize usage of the composite channel by multiple nodes in a wireless network having an access point (AP). Indeed, typical contents have important amount of data, for instance related to high-definition audio-visual real-time and interactive content. Furthermore, it is well-known that the performance of the CSMA/CA protocol used in the IEEE 802.11 standard deteriorates rapidly as the number of nodes and the amount of traffic increase, i.e. in dense WLAN scenarios.

In this context, multi-user transmission has been considered to allow multiple simultaneous transmissions to/from different users in both downlink and uplink directions. In the uplink, multi-user transmissions can be used to mitigate the collision probability by allowing multiple nodes to simultaneously transmit.

To actually perform such multi-user transmission, it has been proposed to split a granted 20 MHz channel into sub-channels (elementary sub-channels), also referred to as resource units (RUs), that are shared in the frequency domain by multiple users, based for instance on Orthogonal Frequency Division Multiple Access (OFDMA) technique.

OFDMA is a multi-user variation of OFDM which has emerged as a new key technology to improve efficiency in advanced infrastructure-based wireless networks. It combines OFDM on the physical layer with Frequency Division Multiple Access (FDMA) on the MAC layer, allowing different subcarriers to be assigned to different nodes in order to increase concurrency. Adjacent sub-carriers often experience similar channel conditions and are thus grouped to sub-channels: an OFDMA sub-channel or RU is thus a set of sub-carriers.

As currently envisaged, the granularity of such OFDMA sub-channels is finer than the original 20 MHz channel band. Typically, a 2 MHz or 5 MHz sub-channel may be contemplated as a minimal width, therefore defining for instance 9 sub-channels or resource units within a single 20 MHz channel.

To support multi-user uplink, i.e. uplink transmission to the 802.11ax access point (AP) during the granted TxOP, the 802.11ax AP has to provide signalling information for the legacy nodes (non-802.11ax nodes) to set their NAV and for the 802.11ax nodes to determine the allocation of the resource units RUs.

It has been proposed for the AP to send a trigger frame (TF) to the 802.11ax nodes to trigger uplink communications.

The document IEEE 802.11-15/0365 proposes that a 'Trigger' frame (TF) is sent by the AP to solicit the transmission of uplink (UL) Multi-User (OFDMA) PPDU from multiple nodes. In response, the nodes transmit UL MU (OFDMA) PPDU as immediate response to the Trigger frame. All transmitters can send data at the same time, but using disjoint sets of RUs, resulting in transmissions with less interference.

The bandwidth or width of the targeted composite channel is signalled in the TF frame, meaning that the 20, 40, 80 or 160 MHz value is added. The TF frame is sent over the primary 20 MHz channel and duplicated (replicated) on each other 20 MHz channels forming the targeted composite channel. As described above for the duplication of control frames, it is expected that every nearby legacy node (non-HT or 802.11ac nodes) receiving the TF on its primary channel, then sets its NAV to the value specified in the TF frame in order. This prevents these legacy nodes from accessing the channels of the targeted composite channel during the TXOP.

A resource unit RU can be reserved for a specific node, in which case the AP indicates, in the TF, the node to which the RU is reserved. Such RU is called Scheduled RU. The nodes do not need to perform contention on accessing scheduled RUs.

In order to better improve the efficiency of the system in regards to un-managed traffic to the AP (for example, uplink management frames from associated nodes, unassociated nodes intending to reach an AP, or simply unmanaged data traffic), the document IEEE 802.11-15/0604 proposes a new trigger frame (TF-R) above the previous UL MU procedure, allowing random access onto the OFDMA TXOP. In other words, the resource unit RU can be randomly accessed by more than one node. Such RU is called Random RU and is indicated as such in the TF. Random RUs may serve as a basis for contention between nodes willing to access the communication medium for sending data.

The random resource selection procedure is not yet defined. All that is known is that the trigger frame may define only Scheduled RUs, or only Random RUs within the targeted composite channel.

There is no guarantee that the Scheduled or Random RUs will be used by the nodes.

It is particularly the case for the Random RUs because any rule used by the nodes to select a Random RU may result in having RUs not allocated at all to any node. Also, the AP does not know whether or not some nodes need bandwidth. In addition, some RUs provided by the AP may not be accessible for some nodes because of hidden legacy nodes.

It is also the case for the Scheduled RUs (which are reserved by the AP because some nodes have explicitly requested bandwidth) if the specified nodes do not send data.

It results that the channel bandwidth is not optimally used.

Furthermore, the more unused RUs within a 20 MHz channel, the lower the average energy over this 20 MHz channel.

However, since the legacy nodes not registered to the AP use this average energy over their primary 20 MHz to sense whether it is idle or busy, the presence of unused RUs increases the risk that legacy nodes sense the corresponding 20 MHz channel as idle. The legacy nodes may then transmit data on this 20 MHz channel, thus colliding with the data traffic conveyed over the used RUs.

SUMMARY OF INVENTION

It is a broad objective of the present invention to provide wireless communication methods and devices in a wireless network. The wireless network includes an access point and a plurality of nodes, all of them sharing the physical medium of the wireless network.

The present invention has been devised to overcome one or more foregoing limitations.

In this context, the present invention seeks to provide wireless communication methods having improved mechanisms against collisions in communication channels.

The invention can be applied to any wireless network in which an access point provides the registered nodes with a plurality of sub-channels (or resource units) forming a communication channel. The communication channel is the elementary channel on which the nodes perform sensing to determine whether it is idle or busy. The invention is especially suitable for data transmission to the AP of an IEEE 802.11ax network (and future version).

First main embodiments of the invention first provide, from the access point's perspective, a wireless communication method in a wireless network comprising an access point and a plurality of nodes, the method comprising the following steps, at the access point:

sending a trigger frame to the nodes, the trigger frame reserving at least one communication channel of the wireless network and defining a plurality of resource units forming the communication channel;

sensing at least one unused resource unit on which no data transmission is in progress during a sensing period after the sending of the trigger frame; and emitting a signal on the sensed unused resource unit or units.

The same first main embodiments of the invention provide, from the node's perspective, a wireless communication method in a wireless network comprising an access point and a plurality of nodes, the method comprising the following steps, at one of said nodes:

receiving a trigger frame from the access point, the trigger frame reserving at least one communication channel of the wireless network and defining a plurality of resource units forming the communication channel;

sensing at least one unused resource unit on which no data transmission is in progress during a sensing period after the reception of the trigger frame; and emitting a signal on the sensed unused resource unit or units.

The risk that legacy nodes do not detect activity on a 20 MHz channel having only a subpart of its RUs used is reduced. Risks of collisions are thus reduced.

This is achieved by providing an additional energy on one or more unused resource units, through emission of a signal. As a result, the overall energy level over the 20 MHz communication channel may be raised above the ED threshold, and the legacy nodes no longer sense this channel as idle.

Correlatively, the invention provides a communication device acting as an access point in a wireless network also comprising a plurality of nodes, the communication device acting as an access point comprising at least one microprocessor configured for carrying out the steps of:

sending a trigger frame to the nodes, the trigger frame reserving at least one communication channel of the wireless network and defining a plurality of resource units forming the communication channel;

sensing at least one unused resource unit on which no data transmission is in progress during a sensing period after the sending of the trigger frame; and emitting a signal on the sensed unused resource unit or units.

From the node's perspective, the invention also provides a communication device in a wireless network comprising an access point and a plurality of nodes, the communication device being one of the nodes and comprising at least one microprocessor configured for carrying out the steps of:

receiving a trigger frame from the access point, the trigger frame reserving at least one communication channel of the wireless network and defining a plurality of resource units forming the communication channel;

sensing at least one unused resource unit on which no data transmission is in progress during a sensing period after the reception of the trigger frame; and emitting a signal on the sensed unused resource unit or units.

Optional features of embodiments of the invention are defined in the appended claims. Some of these features are explained here below with reference to a method, while they can be transposed into system features dedicated to any node device according to embodiments of the invention.

In embodiments, the sensing period lasts for a predefined duration (e.g. two aSlotTime time units) from a predefined start time (e.g. a SIFS after the TF) at which the node or nodes start transmitting data on the resource unit or units. Thus, the duration of the sensing or monitoring period is about DIFS-SIFS, during which no contended node will try to access the network.

In embodiments, the signal is made of padding data. It means that the data do not convey content for the AP. This configuration may enable having two nodes emitting a signal on the same RU according to the invention, in order to offer protection against one hidden node.

In other embodiments, emitting a signal includes sending data to the access point. This configuration optimizes use of bandwidth.

In embodiments, the signal is emitted until an end time at which all the nodes stop transmitting on all the resource units forming the communication channel. As all the RUs are used for the same TXOP time, it is ensures that the energy level of the communication channel does not drop below the energy detection threshold before the end of transmission on one RU.

In a particular embodiment, the trigger frame includes a transmission duration based on which the end time is calculated. It makes it possible for all the nodes to synchronize their uplink transmission, in order to guarantee a synchronized end of transmission.

In embodiments, the signal is emitted on a subset only of the sensed unused resource units, with own signal strength so that overall signal strength over the communication channel is above a signal strength threshold.

This configuration makes it possible for nodes having limited capacities (for instance nodes able to emit a signal on a limited number of RUs less than the number of unused RUs) to adapt signal strength in order to satisfy channel detection by the legacy nodes.

In addition, the configuration may help some nodes to reduce energy consumption, by limiting the number of resource units on which a signal is to be sent.

In embodiments, if the access point or node (acting as a monitoring node) senses that all the resource units forming a communication channel are unused, the access point or node (acting as a monitoring node) does not emit a signal on those resource units forming the communication channel. This configuration advantageously frees a communication channel. Thus use of bandwidth is optimized and made fairer.

In embodiments where one of the nodes (i.e. not the access point) emits the signal, the method may further comprise, at the node, transmitting data on one resource unit during the sensing period, and determining on which unused resource unit or units to emit the signal, based on which resource unit the node transmits data.

Such determination may avoid having the access point specifying the signal emitting nodes within the trigger frame. Bits therein are thus saved.

In a specific embodiment, the resource units are ordered within the communication channel, and the unused resource unit or units on which to emit the signal are further determined relative to the order of the resource units. For instance, a node may monitor and emit a signal (if needed) on the RU or RUs following a first RU on which it is transmitting data.

In embodiments, the trigger frame indicates a specific node which is allowed to emit a signal on each unused resource unit of the communication channel.

In alternative embodiments, the trigger frame indicates a specific node per resource unit, which is allowed to emit a signal on this resource unit if unused.

These configurations make the determination of which node has to send a signal on a specific unused RU very simple. This is particularly adapted to networks with light (low resources) nodes.

In embodiments, the method further comprises evaluating overall signal strength over the communication channel during the sensing period;

wherein emitting a signal on the sensed unused resource unit or units depends on the evaluated overall signal strength.

This configuration avoids having a signal systematically sent on unused RUs. Such a signal is emitted only if required with respect to the overall signal strength. It results that energy can be saved (by not emitting the signal when not useful).

In a specific embodiment, the signal is emitted with own signal strength so that overall signal strength over the communication channel is above a signal strength threshold. This configuration optimizes use of energy in the node/access point emitting the signal.

In a specific embodiment where one of the nodes (i.e. not the access point) emits the signal, the trigger frame includes a signal strength threshold to be compared to the evaluated overall signal strength in order to determine whether or not emitting the signal on the sensed unused resource unit or units in the communication channel. So the AP may force the nodes to emit strong signals, thus preventing hidden nodes from accessing the network.

In embodiments, the trigger frame defines which resource unit or units of the communication channel are reserved for specified nodes (i.e. scheduled RUs) and which resource unit or units of the communication channel the nodes access on a random basis, i.e. using a contention scheme (i.e. scheduled RUs).

In embodiments, the trigger frame is duplicated over one or more other communication channels to reserve the other communication channel or channels, the trigger frame defining one or more scheduled resource units on which respective specified nodes are allowed to transmit data and one or more random resource units that the nodes access on a random basis, wherein the scheduled resource units and the random resource units are substantially uniformly distributed over the reserved communication channels.

This configuration also reduces the risk that legacy nodes do not detect activity on a 20 MHz channel having only a subpart of its RUs used, and thus the risk of collisions.

This is due to the uniform distribution of the scheduled RUs and the random RUs. Indeed, as the scheduled RUs are more liable to be used by the associated nodes, the configuration defined above reduces the risk that a communication channel has a very low overall energy level. The legacy nodes will statistically sense more often the channels as busy, thus avoiding collisions to occur.

In a specific embodiment, applying the uniform distribution depends on the number of scheduled resource units, and if the number of scheduled resource units is less than the number of resource units forming a primary communication channel on which the access point and the nodes contend for accessing a composite channel, the scheduled resource units are concentrated within the primary communication channel. In a variant, if the number of scheduled resource units is less than the number of communication channels, the scheduled resource units are concentrated within a single communication channel (preferably the primary channel).

Second main embodiments of the invention provide, from the access point's perspective, a wireless communication method in a wireless network comprising an access point and a plurality of nodes, the method comprising, at the access point, the step of sending duplicated trigger frames to the nodes, the duplicated trigger frames reserving a plurality of communication channels each made of an ordered plurality of resource units, the duplicated trigger frames defining one or more scheduled resource units on which respective specified nodes are allowed to transmit data and one or more random resource units that the nodes access on a random basis (i.e. using a contention scheme), wherein the scheduled resource units and the random resource units are substantially uniformly distributed over the plurality of communication channels.

The same second main embodiments of the invention provide, from the node's perspective, a wireless communication method in a wireless network comprising an access point and a plurality of nodes, the method comprising, at one of said nodes, the step of receiving duplicated trigger frames from the access point, the duplicated trigger frames reserving a plurality of communication channels each made of an ordered plurality of resource units, the duplicated trigger frames defining one or more scheduled resource units on which respective specified nodes are allowed to transmit data and one or more random resource units that the nodes access on a random basis, wherein the scheduled resource units and the random resource units are substantially uniformly distributed over the plurality of communication channels.

The risk that legacy nodes do not detect activity on a 20 MHz channel having only a subpart of its RUs used is reduced. Risks of collisions are thus reduced.

This is achieved by uniformly distributing the scheduled RUs and the random RUs over the communication channels. As a result, as the scheduled RUs are more liable to be used by the associated nodes, the second main embodiments reduce the risk that a communication channel has a very low overall energy level. The legacy nodes will statistically sense more often the channels as busy, thus avoiding collisions to occur.

Correlatively, the invention provides a communication device acting as an access point in a wireless network also comprising a plurality of nodes, the communication device acting as an access point comprising at least one microprocessor configured for carrying out the step of sending duplicated trigger frames to the nodes, the duplicated trigger frames reserving a plurality of communication channels each made of an ordered plurality of resource units, the duplicated trigger frames defining one or more scheduled resource units on which respective specified nodes are allowed to transmit data and one or more random resource units that the nodes access on a random basis, wherein the scheduled resource units and the random resource units are substantially uniformly distributed over the plurality of communication channels.

From the node's perspective, the invention also provides a communication device in a wireless network comprising an access point and a plurality of nodes, the communication device being one of the nodes and comprising at least one microprocessor configured for carrying out the step of receiving duplicated trigger frames from the access point, the duplicated trigger frames reserving a plurality of communication channels each made of an ordered plurality of resource units, the duplicated trigger frames defining one or more scheduled resource units on which respective specified nodes are allowed to transmit data and one or more random resource units that the nodes access on a random basis, wherein the scheduled resource units and the random resource units are substantially uniformly distributed over the plurality of communication channels.

Optional features of embodiments of the invention are defined in the appended claims. Some of these features are explained here below with reference to a method, while they can be transposed into system features dedicated to any node device according to embodiments of the invention.

In embodiments, applying the uniform distribution depends on the number of scheduled resource units, and if the number of scheduled resource units is less than the number of resource units forming a primary communication channel on which the access point and the nodes contend for accessing a composite channel, the scheduled resource units are concentrated within the primary communication channel. In a variant, if the number of scheduled resource units is less than the number of communication channels, the scheduled resource units are concentrated within a single communication channel (preferably the primary channel).

In embodiments, the method (at the access point or at one node) further comprises:

sensing at least one unused resource unit on which no data transmission is in progress during a sensing period after the sending (for the AP) or reception (for a node) of the trigger frame; and emitting a signal on the sensed unused resource unit or units In this configuration, the overall energy level over the 20 MHz communication channel can thus be raised above the ED threshold. It results that no legacy node is about to sense this channel as idle. Collisions are avoided.

All the embodiments described above with reference to the first main embodiments may apply to this configuration.

Another aspect of the invention relates to a non-transitory computer-readable medium storing a program which, when executed by a microprocessor or computer system in a device of a wireless network, causes the device to perform any method as defined above.

The non-transitory computer-readable medium may have features and advantages that are analogous to those set out above and below in relation to the methods and node devices.

Another aspect of the invention relates to a wireless communication method in a wireless network comprising an access point and a plurality of nodes, substantially as herein described with reference to, and as shown in, FIG. 8a or FIG. 8b of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 8A and FIG. 8B are flowcharts illustrating general steps of an embodiment of the present invention to allow legacy stations to detect transmissions onto sub-channels (OFDMA Resource Units) in an 802.11ax wireless medium;

FIG. 10 presents the format of a 'RU Information Element' (1010), which may be used according other embodiments of the present invention.

DETAILED DESCRIPTION

The invention will now be described by means of specific non-limiting exemplary embodiments and by reference to the figures.

Figure 1:
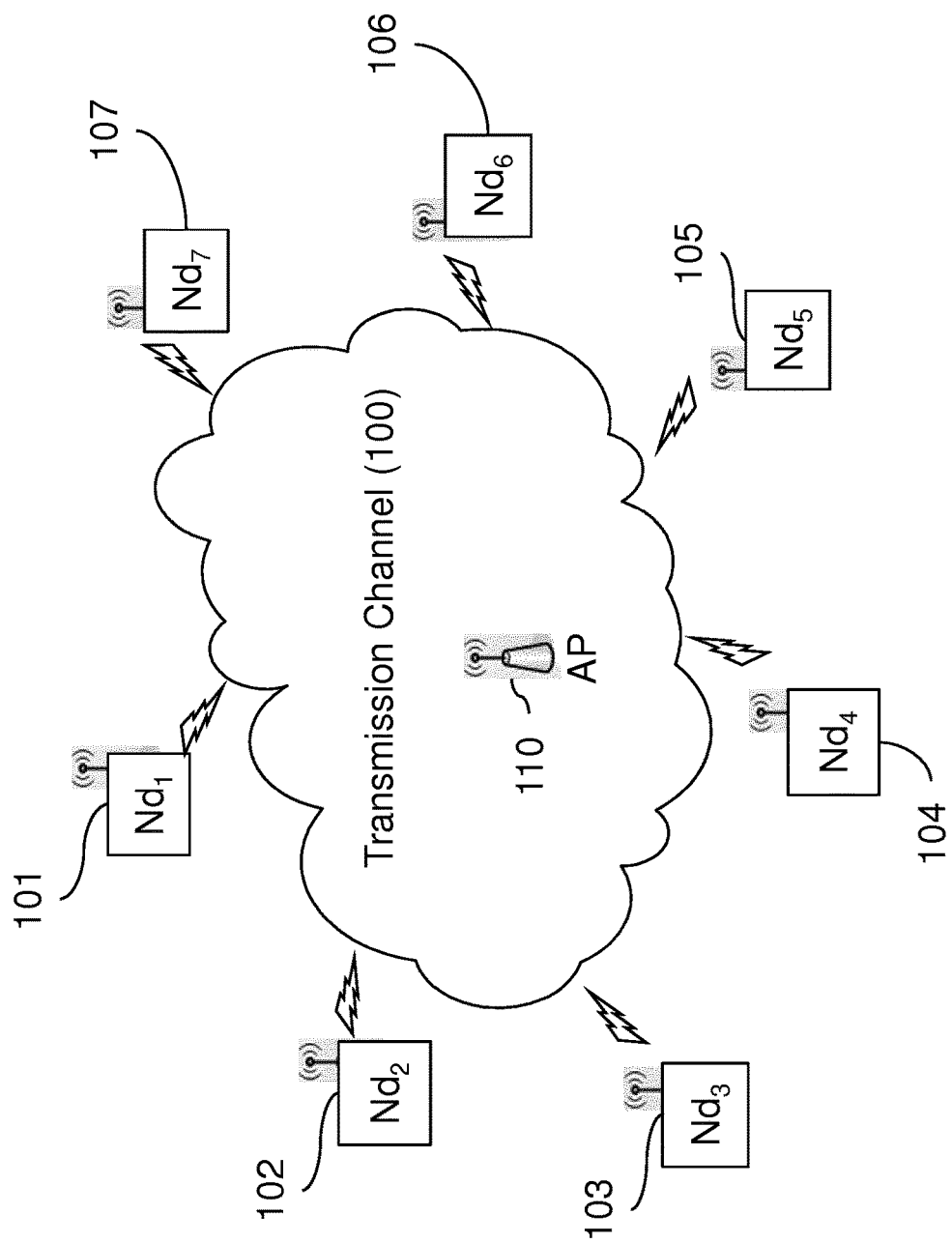
FIG. 1 illustrates a typical wireless communication system in which embodiments of the invention may be implemented.

FIG. 1 illustrates a communication system in which several communication nodes (or stations) 101-107 exchange data frames over a radio transmission channel 100 of a wireless local area network (WLAN), under the management of a central station, or access point (AP) 110. The radio transmission channel 100 is defined by an operating frequency band constituted by a single channel or a plurality of channels forming a composite channel.

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Next, a source node first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the source node continues to wait until the radio medium becomes idle. To do so, it starts a countdown backoff counter designed to expire after a number of timeslots, chosen randomly between [0, CW], CW (integer) being referred to as the Contention Window. This backoff mechanism or procedure is the basis of the collision avoidance mechanism that defers the transmission time for a random interval, thus reducing the probability of collisions on the shared channel. After the backoff time period, the source node may send data or control frames if the medium is idle.

One problem of wireless data communications is that it is not possible for the source node to listen while sending, thus preventing the source node from detecting data corruption due to channel fading or interference or collision phenomena. A source node remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving node if the frames are received with success, to notify the source node that no corruption of the sent data frames occurred.

The ACK is transmitted at the end of reception of the data frame, immediately after a period of time called Short InterFrame Space (SIFS).

If the source node does not receive the ACK within a specified ACK timeout or detects the transmission of a different frame on the channel, it may infer data frame loss. In that case, it generally reschedules the frame transmission according to the above-mentioned backoff procedure. However, this can be seen as a bandwidth waste if only the ACK has been corrupted but the data frames were correctly received by the receiving node.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control frames to reserve the radio medium prior to transmitting data frames during a transmission opportunity called TXOP in the 802.11 standard as described below, thus protecting data transmissions from any further collisions.

Figure 2:
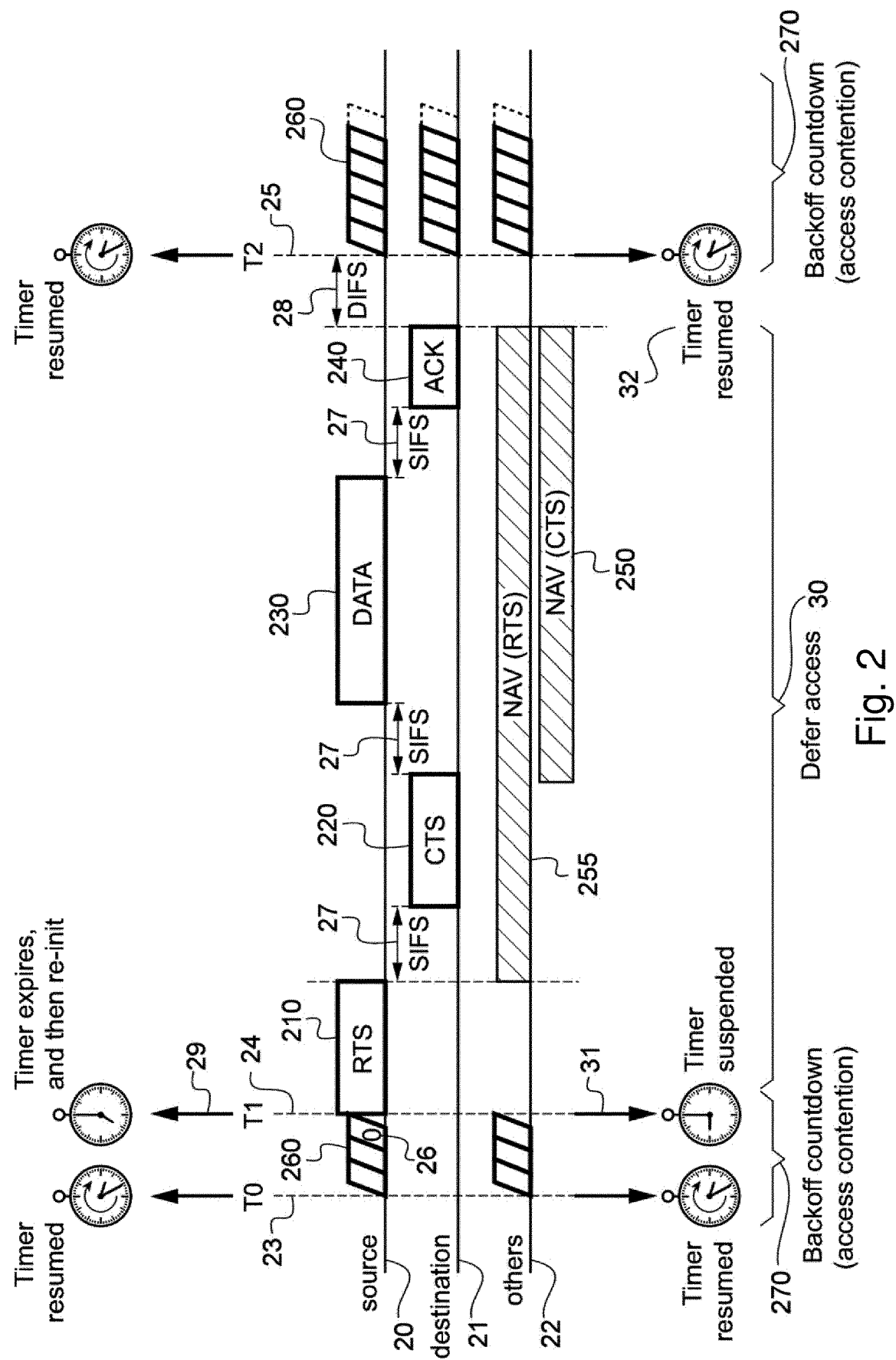
FIG. 2 is a timeline schematically illustrating a conventional communication mechanism according to the IEEE 802.11 standard.

FIG. 2 illustrates the behaviour of three groups of nodes during a conventional communication over a 20 MHz channel of the 802.11 medium: transmitting or source node 20, receiving or addressee or destination node 21 and other nodes 22 not involved in the current communication.

Upon starting the backoff process 270 prior to transmitting data, a station e.g. source node 20, initializes its backoff time counter to a random value as explained above. The backoff time counter is decremented once every time slot interval 260 for as long as the radio medium is sensed idle (countdown starts from T0, 23 as shown in the Figure).

Channel sensing is for instance performed using Clear-Channel-Assessment (CCA) signal detection.

CCA is a WLAN carrier sense mechanisms defined in the IEEE 802.11-2007 standards as part of the Physical Medium Dependant (PMD) and Physical Layer Convergence Protocol (PLCP) layer. It involves two functions:

Carrier Sense (CCA-CS) which is the ability of the receiving node to detect and decode an 802.11 frame preamble. From the PLCP header field, the time duration for which the medium will be occupied can be inferred and when such 802.11 frame preamble is detected, a CCA flag is held busy until the end of data transmission.

Energy Detect (CCA-ED) which is the ability of the receiving node to detect non-802.11 energy in a specific 20 MHz channel and back off data transmission. In practice, a level of energy over the 20 MHz channel is sensed and compared to an ED threshold discriminating between a channel state with or without 802.11 energy channel. The ED threshold is for instance defined to be 20 dB above the minimum sensitivity of a PHY layer of the node. If the in-band signal energy crosses this threshold, CCA is held busy until the medium energy becomes below the threshold anew.

The time unit in the 802.11 standard is the slot time called 'aSlotTime' parameter. This parameter is specified by the PHY (physical) layer (for example, aSlotTime is equal to 9 μs for the 802.11n standard). All dedicated space durations (e.g. backoff) add multiples of this time unit to the SIFS value.

The backoff time counter is 'frozen' or suspended when a transmission is detected on the radio medium channel (countdown is stopped at T1, 24 for other nodes 22 having their backoff time counter decremented).

The countdown of the backoff time counter is resumed or reactivated when the radio medium is sensed idle anew, after a DIFS time period. This is the case for the other nodes at T2, 25 as soon as the transmission opportunity TXOP granted to source node 20 ends and the DIFS period 28 elapses. DIFS 28 (DCF inter-frame space) thus defines the minimum waiting time for a source node before trying to transmit some data. In practice, $$DIFS=SIFS+2*aSlotTime.$$

When the backoff time counter reaches zero (26) at T1, the timer expires, the corresponding node 20 requests access onto the medium in order to be granted a TXOP, and the backoff time counter is reinitialized 29 using a new random backoff value.

In the example of the Figure implementing the RTS/CTS scheme, at T1, the source node 20 that wants to transmit data frames 230 sends a special short frame or message acting as a medium access request to reserve the radio medium, instead of the data frames themselves, just after the channel has been sensed idle for a DIFS or after the backoff period as explained above.

The medium access request is known as a Request-To-Send (RTS) message or frame. The RTS frame generally includes the addresses of the source and receiving nodes ("destination 21") and the duration for which the radio medium is to be reserved for transmitting the control frames (RTS/CTS) and the data frames 230. Upon receiving the RTS frame and if the radio medium is sensed as being idle, the receiving node 21 responds, after a SIFS time period 27 (for example, SIFS is equal to 16 μs for the 802.11n standard), with a medium access response, known as a Clear-To-Send (CTS) frame. The CTS frame also includes the addresses of the source and receiving nodes, and indicates the remaining time required for transmitting the data frames, computed from the time point at which the CTS frame starts to be sent.

The CTS frame is considered by the source node 20 as an acknowledgment of its request to reserve the shared radio medium for a given time duration.

Thus, the source node 20 expects to receive a CTS frame 220 from the receiving node 21 before sending data 230 using unique and unicast (one source address and one addressee or destination address) frames.

The source node 20 is thus allowed to send the data frames 230 upon correctly receiving the CTS frame 220 and after a new SIFS time period 27.

An ACK frame 240 is sent by the receiving node 21 after having correctly received the data frames sent, after a new SIFS time period 27.

If the source node 20 does not receive the ACK 240 within a specified ACK Timeout (generally within the TXOP), or if it detects the transmission of a different frame on the radio medium, it reschedules the frame transmission using the backoff procedure anew.

Since the RTS/CTS four-way handshaking mechanism 210/220 is optional in the 802.11 standard, it is possible for the source node 20 to send data frames 230 immediately upon its backoff time counter reaching zero (i.e. at T1).

The requested time duration for transmission defined in the RTS and CTS frames defines the length of the granted transmission opportunity TXOP, and can be read by any listening node ("other nodes 22" in FIG. 2) in the radio network.

To do so, each node has in memory a data structure known as the network allocation vector or NAV to store the time duration for which it is known that the medium will remain busy. When listening to a control frame (RTS 210 or CTS 220) not addressed to itself, a listening node 22 updates its NAVs (NAV 255 associated with RTS and NAV 250 associated with CTS) with the requested transmission time duration specified in the control frame. The listening nodes 22 thus keep in memory the time duration for which the radio medium will remain busy.

Access to the radio medium for the other nodes 22 is consequently deferred 30 by suspending 31 their associated timer and then by later resuming 32 the timer when the NAV has expired.

This prevents the listening nodes 22 from transmitting any data or control frames during that period.

It is possible that receiving node 21 does not receive RTS frame 210 correctly due to a message/frame collision or to fading. Even if it does receive it, receiving node 21 may not always respond with a CTS 220 because, for example, its NAV is set (i.e. another node has already reserved the medium). In any case, the source node 20 enters into a new backoff procedure.

The RTS/CTS four-way handshaking mechanism is very efficient in terms of system performance, in particular with regard to large frames since it reduces the length of the messages involved in the contention process.

In detail, assuming perfect channel sensing by each communication node, collision may only occur when two (or more) frames are transmitted within the same time slot after a DIFS 28 (DCF inter-frame space) or when their own back-off counter has reached zero nearly at the same time T1. If both source nodes use the RTS/CTS mechanism, this collision can only occur for the RTS frames. Fortunately, such collision is early detected by the source nodes since it is quickly determined that no CTS response has been received.

As described above, the original IEEE 802.11 MAC always sends an acknowledgement (ACK) frame 240 after each data frame 230 received.

However, such collisions limit the optimal functioning of the radio network. As described above, simultaneous transmission attempts from various wireless nodes lead to collisions. The 802.11 backoff procedure was first introduced for the DCF mode as the basic solution for collision avoidance. In the emerging IEEE 802.11n/ac/ax standards, the backoff procedure is still used as the fundamental approach for supporting distributed access among mobile stations or nodes.

Figure 3:
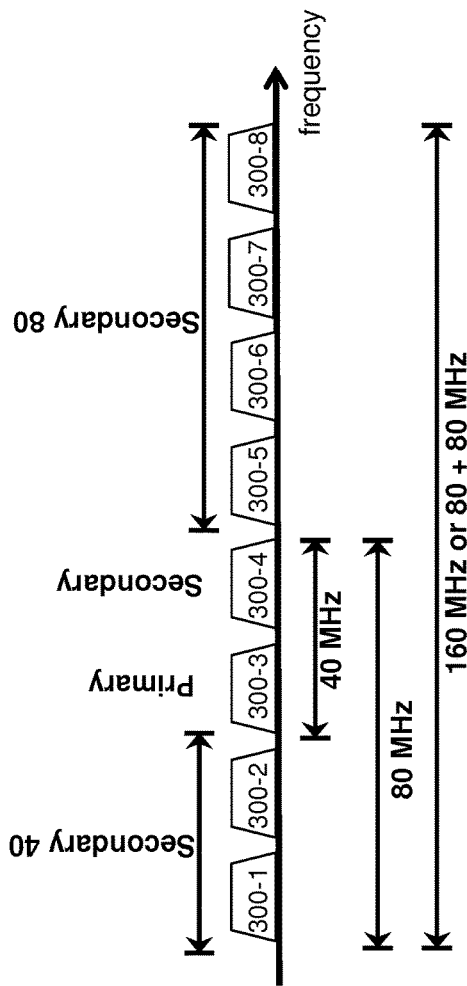
FIG. 3 illustrates 802.11ac channel allocation that support channel bandwidth of 20 MHz, 40 MHz, 80 MHz or 160 MHz as known in the art.

To meet the ever-increasing demand for faster wireless networks to support bandwidth-intensive applications, 802.11ac is targeting larger bandwidth transmission through multi-channel operations. FIG. 3 illustrates 802.11ac channel allocation that support composite channel bandwidth of 20 MHz, 40 MHz, 80 MHz or 160 MHz IEEE 802.11ac introduces support of a restricted number of predefined subsets of 20 MHz channels to form the sole predefined composite channel configurations that are available for reservation by any 802.11ac node on the wireless network to transmit data.

The predefined subsets are shown in the Figure and correspond to 20 MHz, 40 MHz, 80 MHz, and 160 MHz channel bandwidths, compared to only 20 MHz and 40 MHz supported by 802.11n. Indeed, the 20 MHz component channels 300-1 to 300-8 are concatenated to form wider communication composite channels.

In the 802.11ac standard, the channels of each predefined 40 MHz, 80 MHz or 160 MHz subset are contiguous within the operating frequency band, i.e. no hole (missing channel) in the composite channel as ordered in the operating frequency band is allowed.

The 160 MHz channel bandwidth is composed of two 80 MHz channels that may or may not be frequency contiguous. The 80 MHz and 40 MHz channels are respectively composed of two frequency adjacent or contiguous 40 MHz and 20 MHz channels, respectively.

A node is granted a TxOP through the enhanced distributed channel access (EDCA) mechanism on the "primary channel" (300-3). Indeed, for each composite channel having a bandwidth, 802.11ac designates one channel as "primary" meaning that it is used for contending for access to the composite channel. The primary 20 MHz channel is common to all nodes (STAs) belonging to the same basic set, i.e. managed by or registered to the same local Access Point (AP).

However, to make sure that no other legacy node (i.e. not belonging to the same set) uses the secondary channels, it is provided that the control frames (e.g. RTS frame/CTS frame) reserving the composite channel are duplicated over each 20 MHz channel of such composite channel.

As addressed earlier, the IEEE 802.11ac standard enables up to four, or even eight, 20 MHz channels to be bound. Because of the limited number of channels (19 in the 5 GHz band in Europe), channel saturation becomes problematic. Indeed, in densely populated areas, the 5 GHz band will surely tend to saturate even with a 20 or 40 MHz bandwidth usage per Wireless-LAN cell.

Developments in the 802.11ax standard seek to enhance efficiency and usage of the wireless channel for dense environments.

In this perspective, one may consider multi-user transmission features, allowing multiple simultaneous transmissions to different users in both downlink and uplink directions. In the uplink, multi-user transmissions can be used to mitigate the collision probability by allowing multiple nodes to simultaneously transmit.

To actually perform such multi-user transmission, it has been proposed to split a granted 20 MHz channel (300-1 to 300-4) into sub-channels 410 (elementary sub-channels), also referred to as sub-carriers or resource units (RUs), that are shared in the frequency domain by multiple users, based for instance on Orthogonal Frequency Division Multiple Access (OFDMA) technique.

This is illustrated with reference to FIG. 4.

The multi-user feature of OFDMA allows the AP to assign different RUs to different nodes in order to increase competition. This may help to reduce contention and collisions inside 802.11 networks.

Contrary to downlink OFDMA wherein the AP can directly send multiple data to multiple stations (supported by specific indications inside the PLCP header), a trigger mechanism has been adopted for the AP to trigger uplink communications from various nodes.

To support an uplink multi-user transmission (during a pre-empted TxOP), the 802.11ax AP has to provide signalling information for both legacy stations (non-802.11ax nodes) to set their NAV and for 802.11ax nodes to determine the Resource Units allocation.

In the following description, the term legacy refers to non-802.11ax nodes, meaning 802.11 nodes of previous technologies that do not support OFDMA communications.

Figure 4:
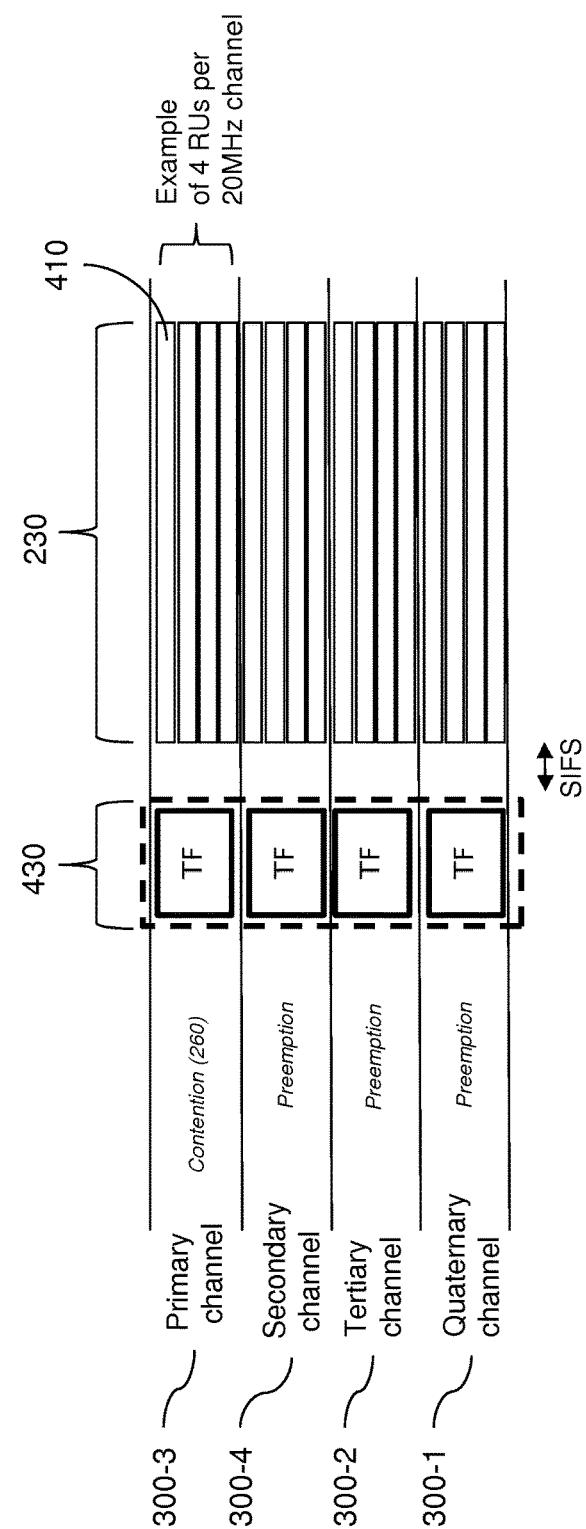
FIG. 4 illustrates an example of 802.11ax uplink OFDMA transmission scheme, wherein the AP issues a Trigger Frame for reserving a transmission opportunity of OFDMA sub-channels (resource units) on an 80 MHz channel as known in the art.

As shown in the example of FIG. 4, the AP sends a trigger frame (TF) 430 to the targeted 802.11ax nodes. The bandwidth or width of the targeted composite channel is signalled in the TF frame, meaning that the 20, 40, 80 or 160 MHz value is added. The TF frame is sent over the primary 20 MHz channel and duplicated (replicated) on each other 20 MHz channels forming the targeted composite channel. As described above for the duplication of control frames, it is expected that every nearby legacy node (non-HT or 802.11ac nodes) receiving the TF on its primary channel, then sets its NAV to the value specified in the TF frame in order. This prevents these legacy nodes from accessing the channels of the targeted composite channel during the TXOP.

Figure 5:
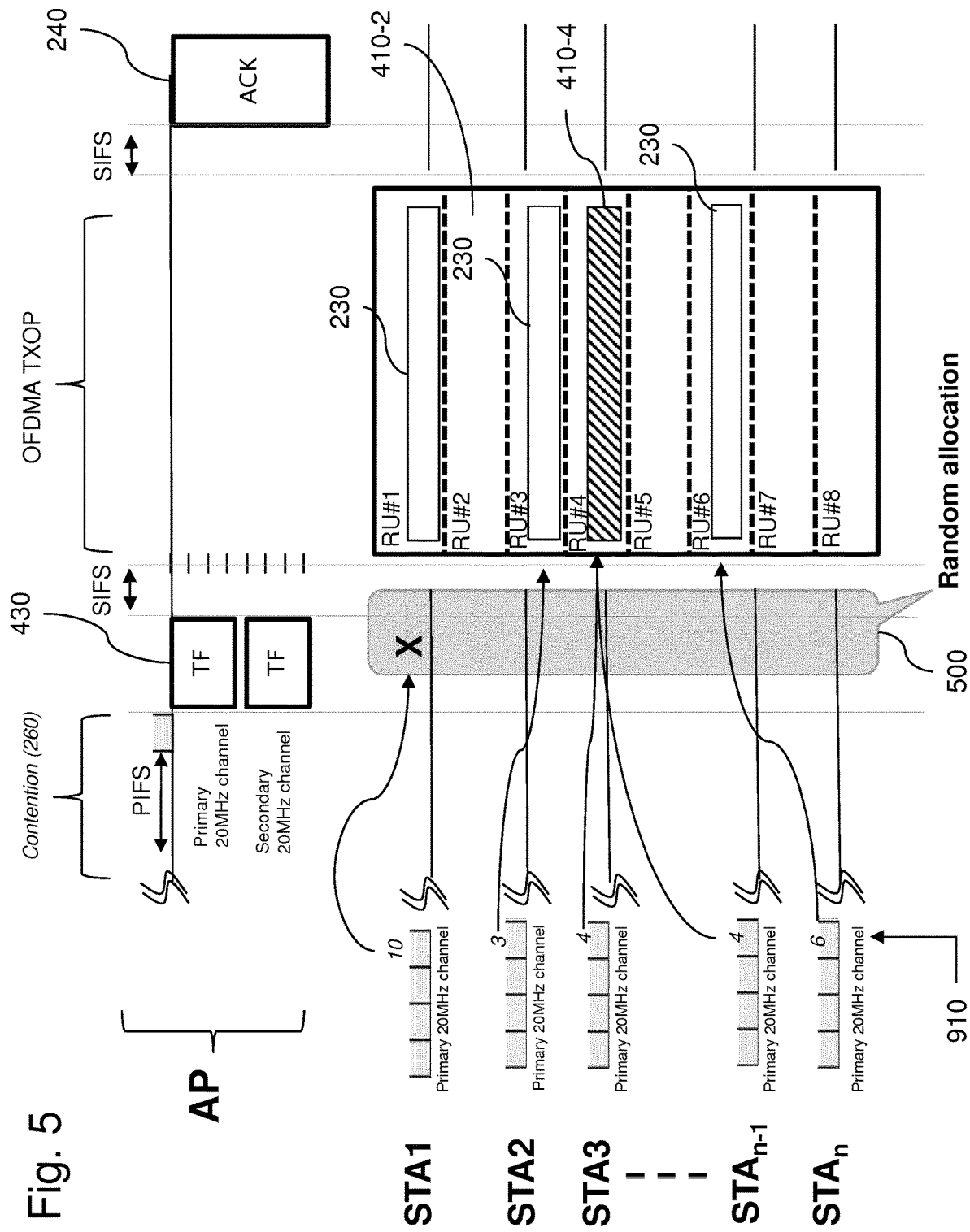
FIG. 5 illustrates exemplary communication lines according to an exemplary random allocation.

The trigger frame TF may designate at least one resource unit (RU) 410, or "Random RU", which can be randomly accessed by more than one node. In other words, Random RUs designated or allocated by the AP in the TF may serve as basis for contention between nodes willing to access the communication medium for sending data. An exemplary embodiment of such random allocation is illustrated by FIG. 5.

The trigger frame TF may also designate Scheduled resource units, in addition or in replacement of the Random RUs. Scheduled RUs may be reserved for certain nodes in which case no contention for accessing such RUs is needed.

In this context, the TF includes information specifying the type (Scheduled or Random) of the RUs. For instance, a tag may be used to indicate that all the RUs defined in the TF are Scheduled (tag=1) or Random (tag=0). In case, Random RUs and Scheduled RUs are mixed within the TF, a bitmap (or any other equivalent information) may be used to define the type of each RU (the bitmap may follow a known order of the RUs throughout the communication channels).

The multi-user feature of OFDMA allows the AP to assign different RUs to different nodes in order to increase competition. This may help to reduce contention and collisions inside 802.11 networks.

In the example of FIG. 4, each 20 MHz channel is sub-divided in frequency domain in four sub-channels or RUs 410, typically of size 5 Mhz. These sub-channels (or resource units) are also referred to as "sub-carriers" or "traffic channels".

Of course the number of RUs splitting a 20 MHz may be different from four. For instance, between two to nine RUs may be provided (thus each having a size between 10 MHz and about 2 MHz).

FIG. 5 illustrates exemplary communication lines according to an exemplary random allocation procedure that may be used by the nodes to access the Random RUs indicated in the TR. This random allocation procedure is based on the reuse of the backoff counter values of the nodes for assigning an RU to a node of the network to send data.

An AP sends a trigger frame TR defining RUs with random access. In the example of the Figure, eight RUs with the same bandwidth are defined for a 40 MHz composite channel, and the TF 430 is duplicated on the two 20 MHz channels forming the composite channel. In other words, the network is configured to handle four OFDMA Resource Units per each 20 MHz channel.

Each node STA1 to STAn is a transmitting node with regards to receiving AP, and as a consequence, each node has at least one active backoff value.

The random allocation procedure comprises, for a node of a plurality of nodes having an active backoff, a first step of determining from the trigger frame the sub-channels or RUs of the communication medium available for contention, a second step of verifying if the value of the active backoff local to the considered node is not greater than the number of detected-as-available RUs, and then a step of sending data is performed on the RU whom number equals the backoff value.

In other words, the Random RUs may be indexed in the TF, and each node uses the RUs having an index equal to the backoff value of the node.

As shown in the Figure, some Resource Units may not be used, for instance RUs indexed 2 (410-2), 5, 7 and 8. This is due to the randomization process, and in the present example, due to the fact that none of the nodes has a backoff value equal to 2, 5, 7 or 8 when the TF is sent.

The legacy 802.11a/n/ac nodes that operate at a 20 MHz channel-width granularity can detect the Trigger Frame in various ways.

In case a legacy node (802.11a/n/ac) has its primary channel operating on one of the 20 MHz channels (300) on which the TF is duplicated, the node can defer its activity using Clear Channel Assessment (CCA). To be precise, the node uses a full CCA on the primary channel, including preamble packet detection (called Signal Detection SD), and performs both physical carrier sensing and virtual carrier sensing. In other words, the node decodes the detected PLCP (Physical Layer Convergence Protocol) preamble from the TF received on its primary channel and use that information to set its NAV (Network Allocation Vector) counter.

In case a legacy node (802.11n/ac) does not have its primary channel within the composite channel used by the AP, but has secondary channel(s) in the composite channel, the node uses a reduced CCA (called energy detection (ED) as the signal is not decodable) on the secondary channel and thus does not set the NAV counter.

CCA on the primary channel is set only if the legacy node has successfully received the Trigger Frame. Note that further OFDMA RU transmissions are not decodable by legacy nodes.

An issue arises with new comers in the network, or more classically with nodes experiencing hidden nodes. Such nodes may perform CCA sensing anew during OFDMA TXOP (i.e. after the TF has been transmitted).

However, a legacy node may not be able to detect a significant signal onto its primary channel if the measurement of total received RF (radiofrequency) power or energy within the defined 20 MHz channel bandwidth suffers from free RUs during TXOP 230. The problem mostly comes from the fact that 802.11 legacy nodes assess availability of the medium based on 20 MHz portions, while UL OFDMA assignments could be narrower and varying across the BSS coverage.

The aforementioned issue of under-usage of Resource Units should be handled with care, as the resulting signal energy on a specific 20 MHz channel could drop under the energy detection (ED) threshold used by the legacy nodes (for example, the energy detection threshold is −62 dBm for a 20 MHz channel width).

Indeed, collisions may occur on under-used 20 MHz channel (i.e. channel in which some RUs are unused) as soon as the legacy nodes do not detect enough signal energy. In other words, an OFDMA TXOP 230 having unused RUs is a factor of increasing of collisions (conducting to a new kind of collision), which is opposite to the intended usage of the Random RUs.

Unuse of Scheduled RUs may lead to the same issue of having legacy nodes colliding the OFDMA traffic on some RUs.

The present invention finds a particular application in enhancements of the 802.11ac standard, and more precisely in the context of 802.11ax wherein dense wireless environments are more ascertained to suffer from previous limitations.

The present invention provides improved wireless communications with more efficient use of bandwidth while limiting the risks of collision.

An exemplary wireless network is an IEEE 802.11ac network (and upper versions). However, the invention applies to any wireless network comprising an access point AP 110 and a plurality of nodes 101-107 transmitting data to the AP through a multi-user transmission. The invention is especially suitable for data transmission in an IEEE 802.11ax network (and future versions) requiring better use of bandwidth.

An exemplary management of multi-user transmission in such a network has been described above with reference to FIGS. 1 to 5.

First embodiments of the present invention provide that, following a trigger frame reserving at least one communication channel of the wireless network and defining a plurality of resource units forming the communication channel, one or more devices in the network perform the following steps:

sensing at least one unused resource unit on which no data transmission is in progress during a sensing (or monitoring) period after the sending or reception of the trigger frame; and emitting a signal on the sensed unused resource unit or units.

Preferably, the device involved is the AP. Alternatively, one of nodes 100-107 may be involved.

The overall energy level over the 20 MHz communication channel can thus be raised above the ED threshold. It results that no legacy node is about to sense this channel as idle. Collisions are avoided.

Second embodiments of the present invention are directed to the cases where duplicated trigger frames are sent to reserve a plurality of communication channels each made of an ordered plurality of resource units, the duplicated trigger frames defining one or more scheduled resource units on which respective specified nodes are allowed to transmit data and one or more random resource units that the nodes access on a random basis (i.e. using a contention scheme). In the second embodiments, it is provided that the scheduled resource units and the random resource units are substantially uniformly distributed over the plurality of communication channels. "substantially uniformly distributed" means that it is sought to have substantially the same number of scheduled resource units over the channels (i.e. the difference in number of scheduled RUs between two channels is at most 1).

As the scheduled RUs are more liable to be used by the associated nodes, the second embodiments reduce the risk that a communication channel has a very low overall energy level. The legacy nodes will statistically sense more often the channels as busy, thus avoiding collisions to occur.

The first and second embodiments can be implemented separately, or in combination as further described below.

Figure 6:
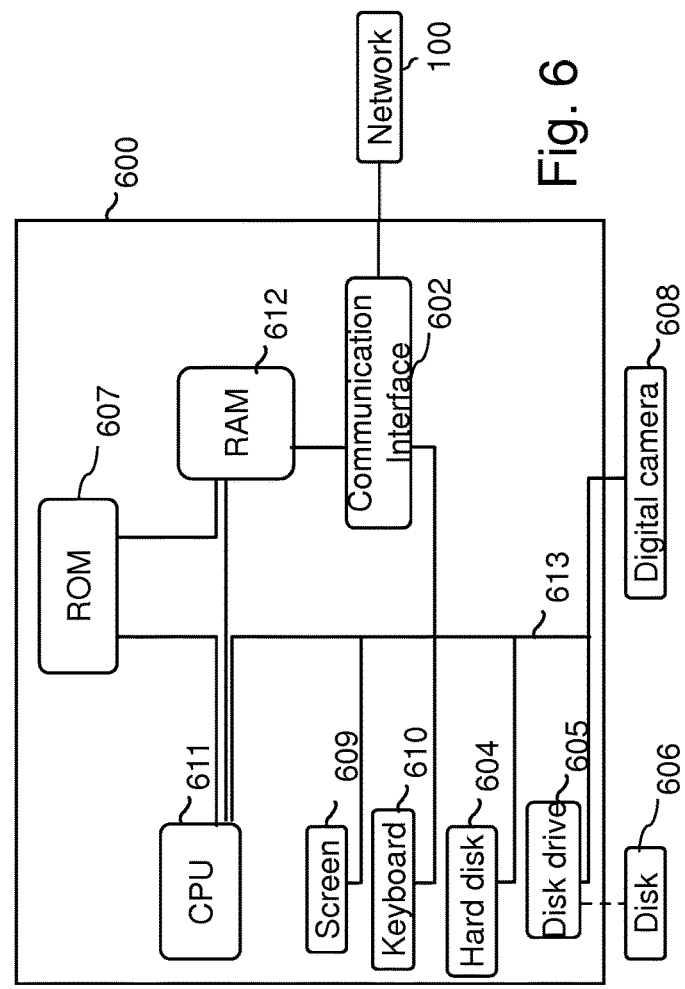
FIG. 6 shows a schematic representation a communication device or station in accordance with embodiments of the present invention.

FIG. 6 schematically illustrates a communication device 600 of the radio network 100, configured to implement at least one embodiment of the present invention. The communication device 600 may preferably be a device such as a micro-computer, a workstation or a light portable device. The communication device 600 comprises a communication bus 613 to which there are preferably connected:

a central processing unit 611, such as a microprocessor, denoted CPU;

a read only memory 607, denoted ROM, for storing computer programs for implementing the invention;

a random access memory 612, denoted RAM, for storing the executable code of methods according to embodiments of the invention as well as the registers adapted to record variables and parameters necessary for implementing methods according to embodiments of the invention; and at least one communication interface 602 connected to the radio communication network 100 over which digital data packets or frames or control frames are transmitted, for example a wireless communication network according to the 802.11ac protocol. The frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:

a data storage means 604 such as a hard disk, for storing computer programs for implementing methods according to one or more embodiments of the invention;

a disk drive 605 for a disk 606, the disk drive being adapted to read data from the disk 606 or to write data onto said disk;

a screen 609 for displaying decoded data and/or serving as a graphical interface with the user, by means of a keyboard 610 or any other pointing means.

The communication device 600 may be optionally connected to various peripherals, such as for example a digital camera 608, each being connected to an input/output card (not shown) so as to supply data to the communication device 600.

Preferably the communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 607, on the hard disk 604 or on a removable digital medium such as for example a disk 606 as described previously. According to an optional variant, the executable code of the programs can be received by means of the communication network 603, via the interface 602, in order to be stored in one of the storage means of the communication device 600, such as the hard disk 604, before being executed.

The central processing unit 611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 7:
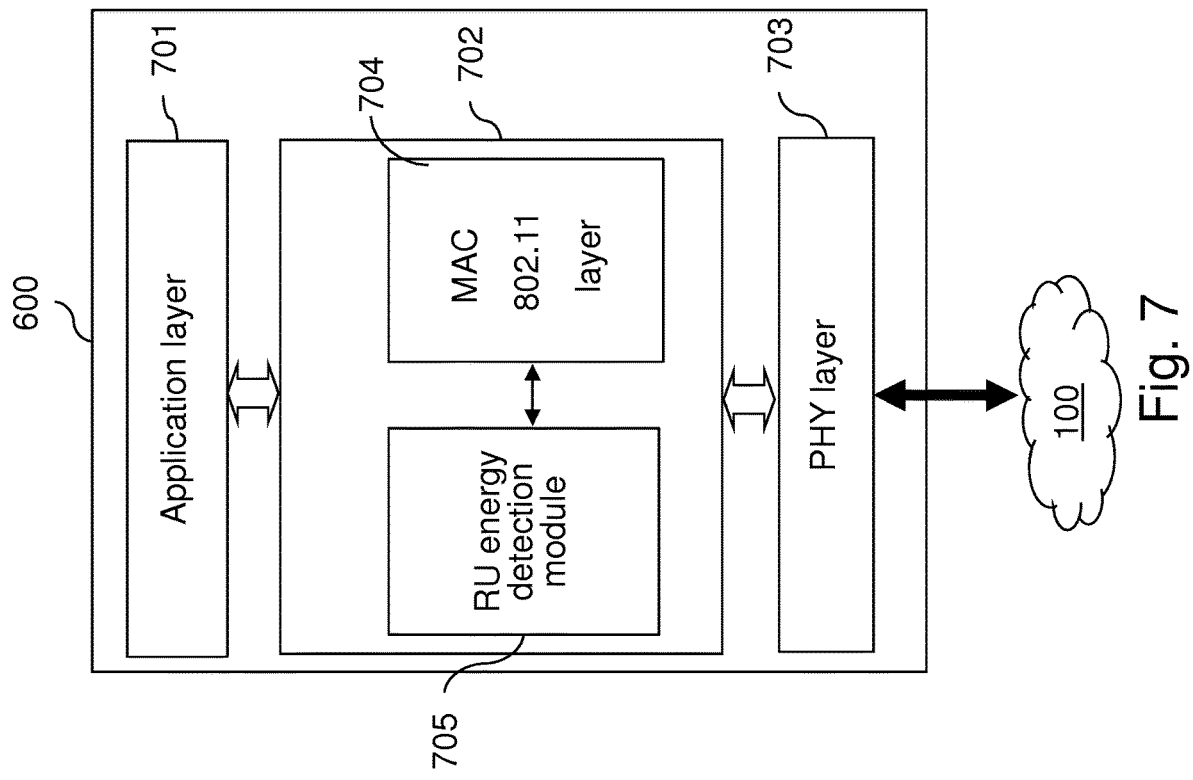
FIG. 7 shows a schematic representation of a wireless communication device in accordance with embodiments of the present invention.

FIG. 7 is a block diagram schematically illustrating the architecture of a communication device or node 600, either the AP 110 or one of nodes 100-107, adapted to carry out, at least partially, the invention. As illustrated, node 600 comprises a physical (PHY) layer block 703, a MAC layer block 702, and an application layer block 701.

The PHY layer block 703 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 430 to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The PHY layer block 703 includes CCA capability to sense the idle or busy state of 20 Mhz channels and to report the result to the MAC 702 according to 802.11 standard. Upon detecting a signal with significant received signal strength, an indication of channel use is generated.

The MAC layer block or controller 702 preferably comprises a MAC 802.11 layer 704 implementing conventional 802.11ax MAC operations, and an additional block 705 for carrying out, at least partially, the invention. The MAC layer block 702 may optionally be implemented in software, which software is loaded into RAM 612 and executed by CPU 611.

Preferably, the additional block, referred to as the OFDMA RU energy detection module 705, implements the part of the invention that regards node 600, i.e. detecting use of OFDMA RUs and energy over a 20 MHz channel based on PHY layer 703. The OFDMA RU energy detection module 705 also performs transmitting and receiving operations on RUs.

On top of the Figure, application layer block 701 runs an application that generates and receives data packets, for example data packets of a video stream. Application layer block 701 represents all the stack layers above MAC layer according to ISO standardization.

FIG. 8 illustrates, using two flowcharts, general steps of embodiments of the present invention. These embodiments provide efficient management of (uplink) multi-user OFDMA transmissions (RUs) in an 802.11ax wireless medium, to reduce risk of collisions with legacy nodes.

The method of FIG. 8 is implemented by at least one node 600. one node is the access point AP 110 to perform flowchart 8a, and one or more other nodes or the same AP can be involved to perform flowchart 8b.

Flowchart 8a illustrates the algorithm performed to prepare a trigger frame TF and transmit it on the wireless channel. This algorithm is performed by the access point AP.

According to embodiments of the present invention, the TF presents a efficient distribution of the OFDMA RUs, in particular a Trigger Frame profile having the scheduled resource units and the random resource units substantially uniformly distributed over the plurality of communication channels composing the targeted composite channel. In particular, both Random and Scheduled RUs are interleaved one with each other.

A goal of this approach is to average signal energy over a 20 MHz channel, if possible above the minimum energy detection threshold of the legacy node, rather than having all the energy concentrated on few 20 MHz channels.

Flowchart 8b illustrates the behaviour of at least one node 600 (either AP 110 or any node 100-107) for monitoring the energy of active RUs forming an uplink OFDMA transmission slot, and performing a signal strength analysis per each 20 MHz communication channel. It means that the node evaluate overall signal strength over the communication channel during the sensing period (from a predefined start time at which the node or nodes start transmitting data on the resource unit or units).

In case of insufficient signal (i.e. energy below the ED threshold), the monitoring node 600 is allowed to communicate over at least one empty RU, i.e. unused RU. In other words, the monitoring node emits a signal on the sensed unused resource unit or units depending on the evaluated overall signal strength.

Preferably, the monitoring node 600 is the access point AP itself, because it is the destination of the uplink traffics and is well positioned to detect the received signals. In a variant, it may be one of the transmitting nodes 100-107.

Note that a transmitting and monitoring node 600 has preferably two or more transmissions chains in order to simultaneously send data in one RUs and monitor usage of other RUs according to the invention. A node having only one transmission chain may still be designated by the AP to act as the monitoring node, but will not be capable to simultaneously send data in one RU: it is only allowed to monitor the energy of one or more communication channels.

While the example of FIG. 8 combines the interleaving of Scheduled and Random RUs with the emission of a signal on unused RUs, these two features may be used alone since both contribute to raise the overall energy per channel over the composite channel, and thus to reduce risks of having legacy nodes transmitting on a channel having RUs used.

Although not limited in this respect, one way to implement the algorithm 8a is as follows.

At step 800, the AP determines the number of Resource Units to consider for the multi-user TXOP upon being granted. This determination is based on the BSS configuration environment, that is to say the basic operational width (namely 20 MHz, 40 MHz, 80 MHz or 160 MHz channels that include the primary 20 MHz channel according the 802.11ac standard).

For the sake of simplicity, one may consider that a fixed number of OFDMA RUs is allocated per 20 MHz band by the 802.11ax standard (for instance nine): in that case, Bandwidth signalling in the TF frames (i.e. 20, 40, 80 or 160 MHz values is added) is sufficient for the nodes to know the number of RUs. Typically, such information is signaled in the SERVICE field of the DATA section of non-HT frames according the 802.11 standard, thus keeping compliance with the medium access mechanism for the legacy nodes.

The TF may include an information element indication that the multi-user TXOP includes either or both random type and scheduled Resource Units 410; that is to say multiple nodes can access a RU inside the OFDMA TXOP either randomly by a random allocation procedure or at a fixed RU location attributed by the AP. In other words, the trigger frame defines which resource unit or units of the communication channel(s) are reserved for specified nodes and which resource unit or units of the communication channel the nodes access on a random basis (using a contention scheme).

In embodiments of the invention, if the allocation includes some fixed allocation (i.e. Scheduled RUs), those fixed allocations are uniformly distributed among the entire composite channels in order to guarantee an average repartition of the channel energy. For instance, if eight Scheduled RUs have to be allocated among 32 RUs forming four 20 MHz channels, two Scheduled RUs may be positioned in each one of the four 20 MHz channels.

Next to step 800, step 801 consists for the AP to determine one node to be declared as the monitoring station for a given 20 MHz channel.

In a preferred embodiment, the AP considers itself as the monitoring station for all 20 MHz channels forming the composite channel in which case the flowchart of FIG. 8b is performed by the AP only.

In a variant, the AP can select a registered node per 20 MHz channel for it to monitor the considered 20 MHz channel in which case the flowchart of FIG. 8b is performed by this node for the considered 20 MHz channel. Thanks to the registration process of the nodes to the AP, the AP may identify, for the appropriate 20 MHz channel, the corresponding monitoring node by its association identifier (AID), in the TF. In that case, the trigger frame indicates a specific node which is allowed to emit a signal on each unused resource unit of the considered communication channel.

In other variants, rather than associating a monitoring node per 20 MHz channel, a monitoring node may be defined for each RU. In that case, the trigger frame indicates a specific node per resource unit, which is allowed to emit a signal on this resource unit if unused.

FIG. 10 proposes a format for an Information Element inside a TF frame to indicate the allocation of a monitoring node with a given Resource Unit.

Note that other variants may consider a dynamic procedure to assign which node is a monitoring node, without having the AP specifying it in the TF. For instance, the dynamic procedure may assign a node transmitting on one RU to monitor the adjacent or next RU in the same 20 MHz channel. In other words, the node may transmit data (uploading data to the AP) on one resource unit during the sensing period, and determine on which unused resource unit or units to emit the signal, based on which resource unit the node transmits data. If the resource units are ordered within the communication channel, the unused resource unit or units on which to emit the signal may be further determined relative to the order of the resource units, for instance the next resource unit or units (note that the AP may be in charge of the first RU or RUs of the 20 MHz channel if unused).

Next to step 801, step 802 consists for the AP to send a TF frame (and possibly duplicates thereof if the composite channel includes more than one 20 MHz channel) with an indication of the bandwidth of the targeted TXOP.

The TF also defines the RUs and their types (Scheduled or Random).

When appropriate, the TF also include an indication of which node is a monitoring node for specific 20 MHz channel(s) and/or RUs.

It is expected that every nearby node (legacy or 802.11ac) can receive the TF on its primary channel. Each of these nodes then sets its NAV to the value specified in the TF frame: the medium is thus theoretically reserved by the AP.

To avoid legacy nodes not receiving the Trigger Frame to erroneously sense a 20 MHz channel as available, the algorithm continue with step 803 during which the AP waits for the start of OFDMA transmissions by the nodes in the RUs. This predefined start time at which the node or nodes start transmitting data on the RUs occurs for instance a SIFS interval after the emission (or reception) of the TF frame.

The predefined start time starts the sensing or monitoring period as defined above.

Next, at step 804, it is checked whether or not the AP is a monitoring node. In the affirmative, the AP performs the monitoring and signal emission steps (850 to 856) according the embodiments of the invention. These steps are described below with reference to Flowchart 8b.

Next to the steps 850-856 and in the negative of test 804 (the AP does not monitor any 20 MHz channel), the AP waits (step 805) for the end of the OFDMA TXOP 230 as defined in the TF.

Next, at step 806, the AP sends an acknowledgment frame (ACK frame) related to the received MPDUs from the multiple nodes within the OFDMA TXOP 230.

Preferably, the ACK frame is transmitted in a non-HT duplicate format in each 20 MHz channel of the composite channel. This acknowledgment is necessary for the multiple transmitting nodes to determine if the destination (AP) has well received the OFDMA MPDUs, as the transmitting nodes are not be able to detect collisions inside their selected RUs (for instance collision in RU #4 of FIG. 5 since two nodes have the same backoff value equal to 4).

Turning now to Flowchart 8b, it illustrates the behaviour of at least one monitoring node 600 (either AP 110 or transmitting node 100-107) for monitoring the energy due by the active RUs over a 20 MHz channel, when uplink OFDMA transmission is implemented.

In embodiments, if the signal strength analyzed on a 20 MHz channel is less than a legacy threshold (as example −62 dBm), then the monitoring node sends an OFDMA transmission in relation to the missing level of energy. For instance, it emits a signal on the unused resource unit or units.

In variant, the signal strength analysis may be avoided, and a signal is automatically emitted on each unused resource unit or units.

As described above with reference to FIG. 8a, the AP acting as a monitoring node, only performs steps 850-856 (if test 804 is positive). All the transmitting nodes registered to the AP perform the whole Flowchart 8b (test 811 described below discriminating between the monitoring nodes and the other nodes).

The process starts at step 810 during which a transmitting node 600 verifies whether or not it has received an 802.11a frame in a non-HT format. Preferably, the type/sub-type indicates a trigger frame TF type, and the Receiver Address (RA) of the TF is a broadcast or group address (this is not a unicast address corresponding to the node 600 MAC address).

Upon receiving the trigger frame TF, the composite channel width occupied by the TF control frame is signaled in the SERVICE field of the 802.11 data frame (The DATA field is composed of SERVICE, PSDU, tail, and pad parts).

At step 811, the transmitting node 600 verifies whether or not it has to act as a monitoring node for at least one 20 MHz channel of the composite channel width.

For instance it may search for any Information Element inside the trigger frame that specifies the transmitting node 600 is designated (the format of such indication is provided as example in regards to FIG. 10) as a monitoring node for a specific 20 MHz channel.

In a variant based on a dynamic procedure, the transmitting node is automatically a monitoring node as soon as it transmits on one RU. In the example above, it is in charge of the next RU or RUs in case they are not used by other nodes.

A positive verification conducts to apply steps 850 to 856.

In case of the transmitting node has not to act as a monitoring node, the algorithm stops at step 812. That is to say, the node continues any usual action independent of the current invention: the node STA responds to the received TF with at least one 802.11 PPDU frame (PPDU means PLOP Protocol Data Unit, with PLOP for Physical Layer Convergence Procedure; basically a PPDU refers to an 802.11 physical frame) in an 802.11ax format after a SIFS period in a Scheduled Resource Unit of the OFDMA TXOP 230 if it is dedicated to it, or in a Random RU if an Random RU allocation scheme allocates it with such a Random RU.

Focus is now on steps 850-856 performed by the monitoring node (either AP or transmitting node).

At step 850, the monitoring node monitors the energy level of the considered 20 MHz channel using conventional sensing mechanism. Thanks to the loop 851, the sensing or monitoring period lasts for a predefined duration, e.g. two aSlotTime time units, from a predefined start time (e.g. SIFS after the TF) at which the node or nodes start transmitting data on the resource unit or units. This duration corresponds to DIFS SIFS', wherein the DIFS (standing for DCF InterFrame Spacing) corresponds to the time period that an 802.11 node should sense a medium as idle before transmitting new data frames.

The sensing or monitoring period has thus a known duration.

During the monitoring period, module 705 computes the signal energy over the 20 MHz channel assigned to the monitoring node for monitoring.

Once the sensing period ends, the monitoring node has evaluated signal energy for the 20 MHz channel, and can compare it to an ED threshold at step 852. If there is enough signal energy, the process continues at step 856.

Otherwise, the monitoring node determines (step 853) which (Scheduled and/or Random) RUs within the monitored 20 MHz channel are unused. This may be done by analysing the OFDMA signal received to detect which OFDMA slots are unused (i.e. without an UL OFDMA PPDU).

Next, at step 854, the monitoring emits a signal on sensed unused resource unit or units. And the signal is emitted until an end time at which all the nodes stop transmitting on all the resource units forming the communication channel. This is the end time of TXOP 230 as specified in the TF.

The signal is preferably made of padding data (i.e. without content intelligible for the AP). However, in a variant, it may be provided that the signal includes data to the access point (plus possible padding data to reach the transmission duration of TXOP 230).

In a first embodiment, each RU is maintained busy for the time indicated by AP (TXOP 230). It means that a signal is emitted on any RU detected as empty (case 910a of FIG. 9). The monitoring node emits the signal with non-AP station power requirements (which are often less than allowed power value for access points).

A padding transmission may be equivalent to the A-MPDU padding as defined in 802.11ac specifications, which is used if a node does not have enough data to fill the available PSDU bytes.

To save energy, the signal emitted on the unused RU or RUs is with own signal strength so that overall signal strength over the 20 MHz communication channel is above the ED threshold. In other words, the additional signal emitted by the monitoring node is slightly above the lack of energy detected at step 852 (i.e. equivalent for reaching the ED threshold).

In a second embodiment, if at least two RUs are detected as unused within the 20 MHz channel, the monitoring node may emit a signal on a subpart only of the unused RUs of the 20 MHz channel, provided that the own signal strength of the emitted signal makes that resulting overall signal strength over the 20 MHz communication channel is above the ED threshold.

Figure 9:
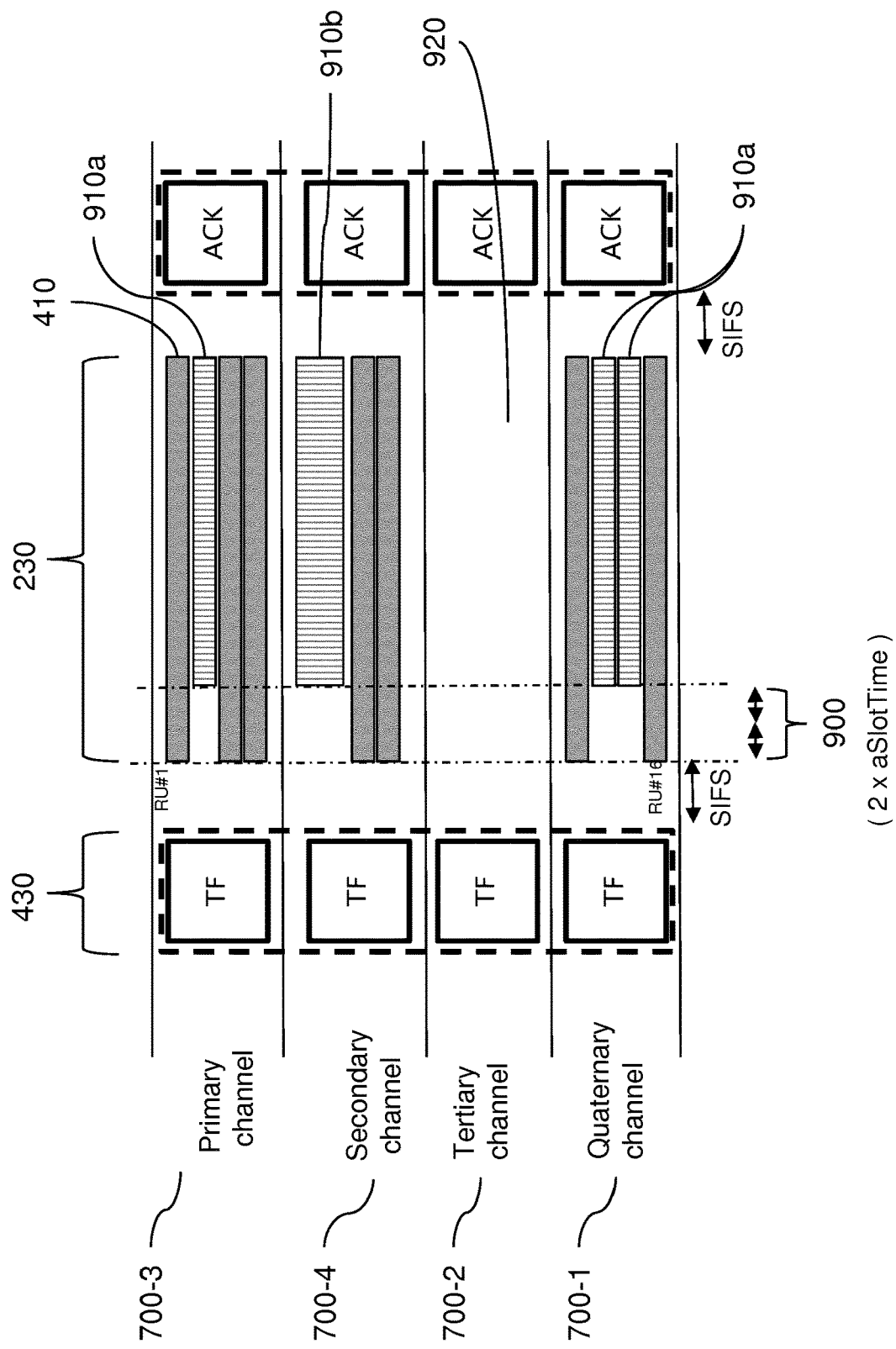
FIG. 9 illustrates exemplary communication lines according to the invention.

In a variant, the monitoring node may aggregate several contiguous RUs for sending a single padding data (case 910b of FIG. 9).

Note that in one embodiment in which no energy detection is made on the 20 MHz channel, steps 850-852 may be avoided. The monitoring node automatically emits a signal on the unused RUs.

Next to step 854, step 855 consists for the monitoring node to stop emitting the signal (padding transmission) upon reading the end of TXOP duration.

Algorithm thus ends for the transmitting nodes (test 856). As far as the AP is concerned, it now returns to usual mode, that is to say sending ACK for received data in used RUs (step 807).

FIG. 9 illustrates exemplary communication lines according to the invention. Although these examples show a WLAN system using a multi-channel including a 80 MHz bandwidth composite channel having a set of 16 OFDMA resource units, the number of 20 MHz bands forming the overall composite channel and/or the number of OFDMA resource units per 20 MHz channel bandwidth thereof may vary.

Also the application of the invention is raised through examples that use the trigger frame mechanism sent by an AP for multi-user uplink transmissions according to 802.11ax. Of course, equivalent mechanisms may be used in an ad-hoc environment (no AP), meaning that a TF is sent by a node. Examples of monitoring nodes include the nodes to which scheduled RUs are allocated.

An AP sends a trigger frame for multi-user uplink transmissions on an overall exemplary 80 MHz composite channel (meaning the TF 430 is duplicated on four 20 MHz channels). This example suggests that the network is configured to handle four OFDMA Resource Units per each 20

MHz channel (all nodes are aware of this configuration, or elsewhere the configuration is specified by the Trigger Frame).

Some Resource Units are not used (as example the indexes 2, 5, 6, 9 to 12, 13 and 14) during the period 900 due to the RU allocation scheme implemented by the nodes.

Reference 900 indicates the sensing or monitoring period corresponding to the loop between steps 850 to 851 of Flowchart 8*b*.

Next, after sensing period 900 is over, step 854 conducts to obtain various padding signals 910. 910*a* is a single padding over one RU. 910*b* is an exemplary padding performed over aggregated contiguous RUs.

Reference 920 illustrates an optional embodiment corresponding to the case of total inactivity over a secondary 20 MHz channel 300. As no OFDMA communication at all occurs, it is possible for the monitoring node executing Flowchart 8*b* to decide to free the whole 20 MHz channel in order to ensure environment fairness. In other words, if the monitoring node senses that all the resource units forming a communication channel are unused, the node does not emit a signal on those resource units forming the communication channel.

FIG. 10 presents the format of a 'RU Information Element' (1010), which may be used according to embodiments of the present invention.

The 'RU Information Element' (1010) is used by the AP to embed additional information inside the trigger frame related to the OFDMA TXOP. Its format follows the 'Vendor Specific information element' format as defined in IEEE 802.11-2007 standard.

The 'RU Information Element' (RU IE, 1010) is a container of one or several RU attributes (1020), having each a dedicated attribute ID for identification. The header of RU IE can be standardized (and thus easily identified by the nodes) through the Element ID, OUI, OUI Type values.

The RU attributes 1020 are defined to have a common general format consisting of a one-byte RU Attribute ID field, a two-byte Length field and variable length attribute specific information fields.

The usage of Information Element inside the MAC frame payload is given for illustration only, any other format may be supportable.

The choice of embedding additional information in the MAC payload is advantageous for keeping legacy compliancy with the medium access mechanism, because any modification performed inside the PHY header of the 802.11 frame would have inhibited any successful decoding of the MAC header by legacy devices.

In regards to step 801, the access point may want to designate a transmitting node as a monitoring node for an entire 20 MHz channel. The trigger frame contains a list of RU attributes 1020, each one being used to specify the transmitting node responsible for a given 20 MHz channel.

To do so, the TF contains a specific information element 1010 in the frame body of the 802.11 MAC frame, which contains the RU attribute 1020 according to FIG. 10.

As shown in the Figure, a dedicated RU attribute follows the following format:

The Attribute ID is a dedicated value identifying the 'RU Info'. A value unused in the standard, e.g. in the range 19-221, may be selected. This one-byte value is a tag starting the 'RU Info'.

The channel field (1021) gives the channel number which is to be considered. For instance, it follows the convention identifier number of 20 MHz channels according to the 802.11 standard.

The AID field (1022) includes the identifier of the node that is designated in charge of monitoring the energy of the corresponding channel (identified by channel field 1021) and sending padding traffic if required. This could be the MAC address, or the Association Identifier (AID), or the Partial AID of the node.

As one can note, the various alternative embodiments presented in FIGS. 8*a*, 8*b* and 10 are compatible one with each other, and may be combined to take advantage of their respective advantages.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication apparatus comprising:
   a transmission unit configured to transmit a trigger frame including first information indicating a plurality of resource units splitting a communication channel in a frequency domain and second information for determining whether a sensing of energy of the communication channel is required,
   wherein, in a case where the second information indicates that the sensing of the energy of the communication channel is required, at least one other communication apparatus identified by an AID (Association ID) included in the trigger frame senses the energy of the communication channel,
   wherein the at least one other communication apparatus does not transmit a signal in a case where the sensed energy exceeds a predetermined threshold, and otherwise transmits a signal on at least one of the plurality of resource units; and
   a receiving unit configured to receive the signal transmitted from the at least one other communication apparatus in response to the trigger frame.

2. The communication apparatus according to claim 1, wherein the trigger frame further includes information related to a timing at which the transmission of the signal by the other communication apparatus is to be stopped.

3. The communication apparatus according to claim 1, wherein the transmission unit further transmits information indicating the predetermined threshold.

4. The communication apparatus according to claim 1, wherein the trigger frame includes information indicating that a communication apparatus from which the signal is to be transmitted is randomly determined for at least a part of the plurality of resource units.

5. A method for controlling a communication apparatus, the method comprising:
   transmitting a trigger frame including first information indicating a plurality of resource units splitting a communication channel in a frequency domain and second information for determining whether a sensing of energy of the communication channel is required at the other communication apparatus, wherein, in a case the second information indicates that the sensing of the energy of the communication channel is required, at least one other communication apparatus identified by an AID (Association ID) included in the trigger frame senses the energy of the communication channel, wherein the at least one other communication apparatus does not transmit a signal in a case where the sensed energy exceeds a predetermined threshold, and otherwise transmits a signal on at least one of the plurality of resource units; and receiving the signal transmitted from the at least one other communication apparatus in response to the trigger frame.

6. A non-transitory computer-readable medium storing a program which, when executed by a microprocessor or computer system in an apparatus, causes the apparatus to carry out each step of the method of claim 5.

7. A communication apparatus comprising:

a receiving unit configured to receive, from an access point, a trigger frame including first information indicating a plurality of resource units splitting a communication channel in a frequency domain and second information for determining whether a sensing of energy of the communication channel is required;

a sensing unit configured to sense the energy of the communication channel in a case where the communication apparatus is identified by an AID (Association ID) included in the trigger frame and the second information indicates that the sensing of the energy of the communication channel is required; and a transmission unit configured not to transmit a signal in a case where the sensed energy exceeds a predetermined threshold, and to transmit a signal on one or more of the resource units otherwise.

8. The communication apparatus according to claim 7, wherein a period for performing the sensing is based on a SIFS period.

9. The communication apparatus according to claim 7, wherein the transmission unit transmits a signal on one or more resource units in a case where no energy sensing is made on the communication channel.

10. The communication apparatus according to claim 7, wherein transmitting a signal includes sending data to the access point.

11. The communication apparatus according to claim 7, wherein the trigger frame indicates a specific apparatus per resource unit from amongst apparatuses registered to the access point, which is allowed to emit a signal on this resource unit if unused.

12. A method for transmitting a signal, the method being performed at a communication apparatus and comprising:

receiving, from an access point, a trigger frame including first information indicating a plurality of resource units splitting a communication channel in a frequency domain and second information for determining whether a sensing of energy of the communication channel is required;

sensing the energy of the communication channel in a case where the communication apparatus is identified by an AID (Association ID) included in the trigger frame and the second information indicates that the sensing of the energy of the communication channel is required; and in a case where the sensed energy exceeds a predetermined threshold, not transmitting a signal, and otherwise transmitting a signal on one or more of the resource units.

13. A non-transitory computer-readable medium storing a program which, when executed by a microprocessor or computer system in an apparatus, causes the apparatus to carry out each step of the method of claim 12.

14. The communication apparatus according to claim 7, further comprising a screen that displays data.

15. The communication apparatus according to claim 1, further comprising a screen that displays data.

* * * * *